(12) United States Patent
Imai et al.

(10) Patent No.: US 9,902,364 B2
(45) Date of Patent: Feb. 27, 2018

(54) GAS GENERATOR

(71) Applicant: NIPPON KAYAKU KABUSHIKI KAISHA, Chiyoda-ku (JP)

(72) Inventors: Takahiro Imai, Himeji (JP); Dairi Kubo, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 15/328,680

(22) PCT Filed: Jul. 23, 2015

(86) PCT No.: PCT/JP2015/071017
§ 371 (c)(1),
(2) Date: Jan. 24, 2017

(87) PCT Pub. No.: WO2016/013630
PCT Pub. Date: Jan. 28, 2016

(65) Prior Publication Data
US 2017/0210333 A1 Jul. 27, 2017

(30) Foreign Application Priority Data

Jul. 24, 2014 (JP) .................................. 2014-150801

(51) Int. Cl.
*B60R 21/264* (2006.01)
*B60R 21/26* (2011.01)

(52) U.S. Cl.
CPC . *B60R 21/2646* (2013.01); *B60R 2021/26011* (2013.01); *B60R 2021/26029* (2013.01); *B60R 2021/26076* (2013.01)

(58) Field of Classification Search
CPC ............. B60R 21/2646; B60R 21/268; B60R 2021/26011; B60R 2021/26029; B60R 2021/26076

(Continued)

(56) References Cited

U.S. PATENT DOCUMENTS 6,234,522 B1    5/2001  Albrecht et al.
6,857,657 B2 *  2/2005  Canterberry .......... B60R 21/272
                                                      280/737

(Continued)

FOREIGN PATENT DOCUMENTS

JP          11-78766 A       3/1999
JP        2002-513347 A      5/2002

(Continued)

OTHER PUBLICATIONS

International Search Report dated Sep. 1, 2015, in PCT/JP2015/071017, filed Jul. 23, 2015.

*Primary Examiner* — Faye M Fleming
(74) *Attorney, Agent, or Firm* — Oblon, McClelland, Maier & Neustadt, L.L.P.

(57) ABSTRACT

A gas generator includes a housing and a partition portion dividing a space in the housing into a combustion chamber accommodating a gas generating agent and a filter chamber accommodating a filter. The partition portion includes a first region which opens at the time of activation by being located to be opposed to a hollow portion of the filter and an annular second region which does not open even at the time of activation by being located to be opposed to a portion of an axial end surface of the filter except for the hollow portion. The second region is provided with a large-thickness portion constructed to be greater in thickness than the first region and opposed to an outer edge portion of the axial end surface of the filter, and the large-thickness portion is constructed to gradually be greater in thickness from an inner circumferential end portion toward an outer circumferential end portion.

12 Claims, 13 Drawing Sheets

(58) Field of Classification Search
USPC .......................................................... 280/737
See application file for complete search history.

(56) References Cited

U.S. PATENT DOCUMENTS

| | | | | |
|---|---|---|---|---|
| 8,794,665 | B2 * | 8/2014 | Biebl | .................. B60R 21/2644 |
| | | | | 102/704 |
| 8,870,222 | B2 * | 10/2014 | Kobayashi | ............ B60R 21/274 |
| | | | | 280/736 |
| 9,751,492 | B2 * | 9/2017 | Kobayashi | ............ B60R 21/272 |
| 2011/0265678 | A1 * | 11/2011 | Sasamoto | ........... B60R 21/2644 |
| | | | | 102/530 |
| 2012/0042801 | A1 | 2/2012 | Sasamoto et al. | |
| 2012/0048137 | A1 | 3/2012 | Hagihara et al. | |
| 2017/0015273 | A1 * | 1/2017 | Kobayashi | ............ B60R 21/268 |
| 2017/0043743 | A1 * | 2/2017 | Kobayashi | ............ B60R 21/274 |

FOREIGN PATENT DOCUMENTS

| | | |
|---|---|---|
| JP | 2002-166818 A | 6/2002 |
| JP | 2005-313812 A | 11/2005 |
| JP | 2010-260387 A | 11/2010 |
| WO | 2010/079710 A1 | 7/2010 |

\* cited by examiner

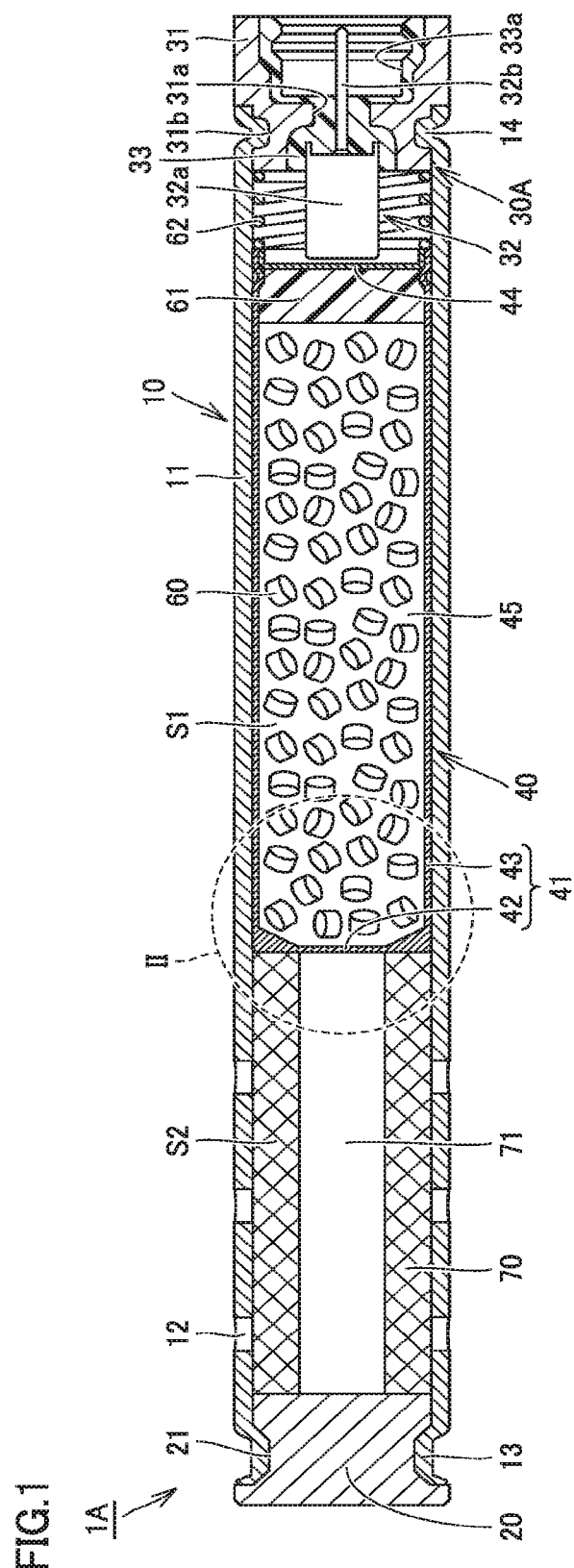

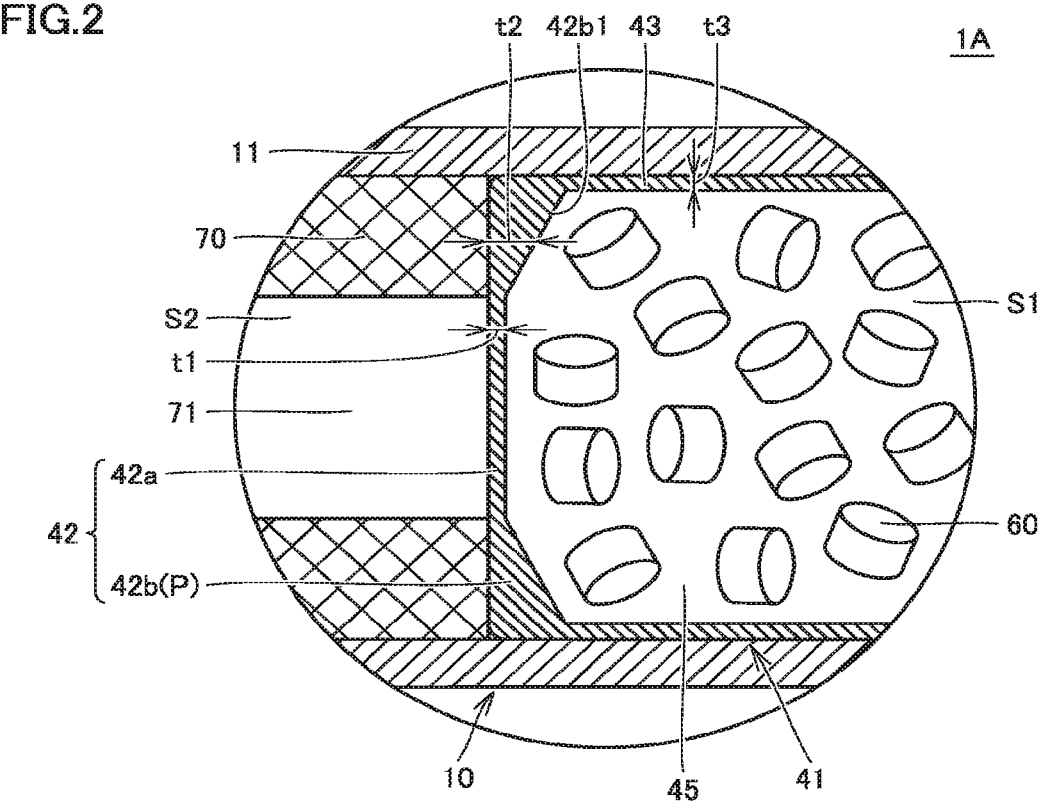
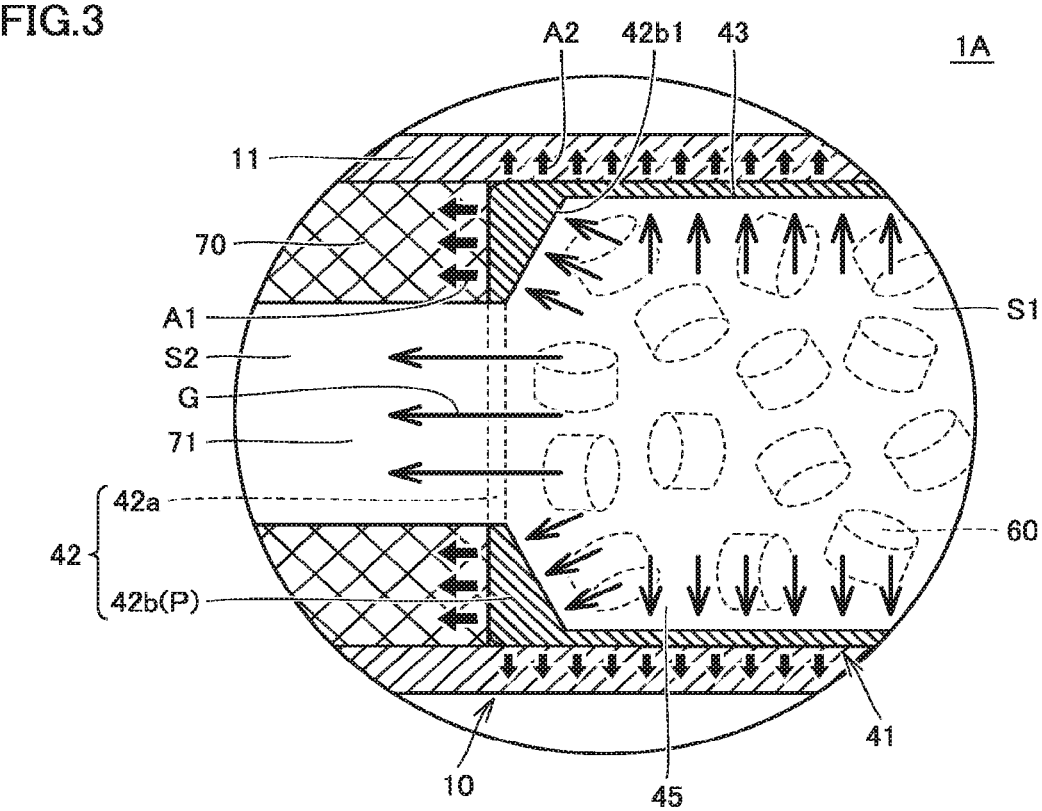

FIG.21
FIG.22
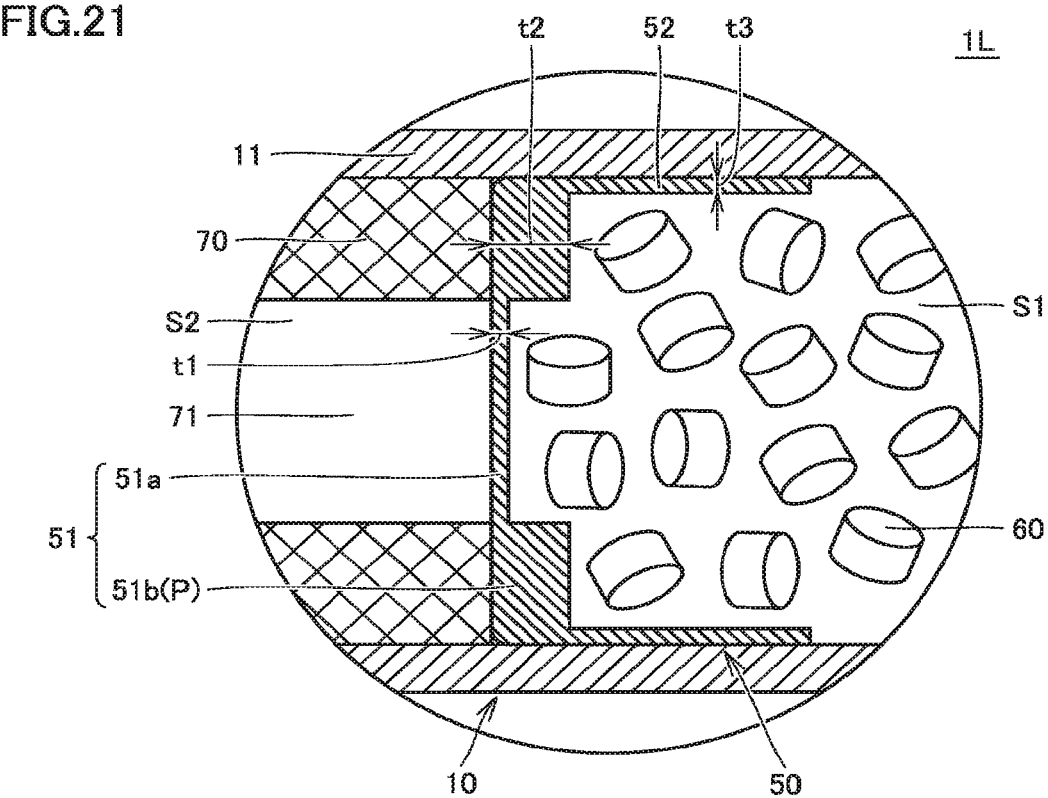
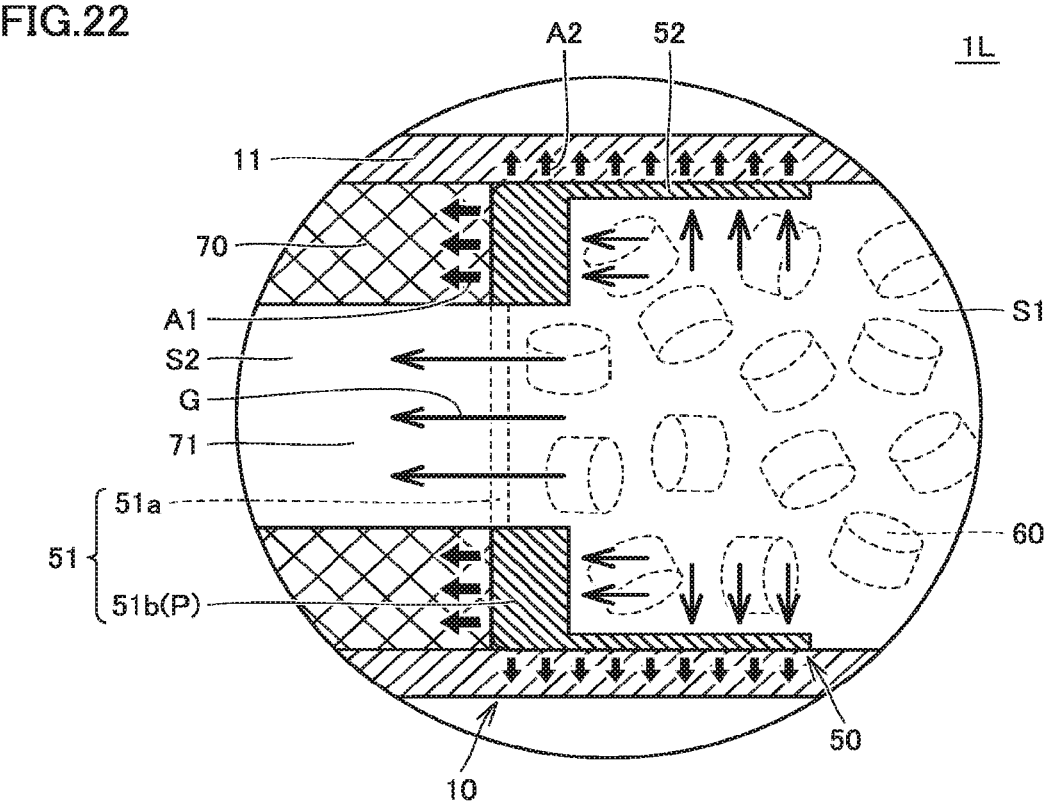

US 9,902,364 B2

GAS GENERATOR

TECHNICAL FIELD

The present invention relates to a gas generator incorporated in an air bag apparatus as a passenger protection apparatus equipped in a car and the like, and particularly to a gas generator having an elongated columnar outer geometry.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with a developed air bag by instantaneously expanding and developing the air bag at the time of collision of a vehicle. A gas generator is equipment which is incorporated in an air bag apparatus and expands and develops an air bag by instantaneously generating a gas at the time of collision of a vehicle.

Depending on a position of installation in a vehicle and the like or on specifications such as output, gas generators of various constructions are available. A gas generator called a cylinder type gas generator represents one example. The cylinder type gas generator has an outer geometry in an elongated columnar shape and it is suitably incorporated in a side air bag apparatus, an air bag apparatus on a passenger's seat side, a curtain air bag apparatus, a knee air bag apparatus, or a seat cushion air bag apparatus.

Normally, in a cylinder type gas generator, an igniter is installed at one end portion in an axial direction of a housing, a combustion chamber accommodating a gas generating agent is provided in a central portion in the axial direction of the housing, a filter chamber accommodating a filter is provided at the other end portion in the axial direction of the housing, and a gas discharge opening is provided in a circumferential wall portion of the housing in a portion defining the filter chamber. In the cylinder type gas generator thus constructed, in general, a gas generated in the combustion chamber flows into the filter chamber and passes through the filter, and the gas which has passed through the filter is discharged to the outside through the gas discharge opening. In addition to the cylinder type gas generator, what is called a T-shaped gas generator is available as a gas generator having an elongated columnar outer geometry.

For example, Japanese Patent Laying-Open No. 2005-313812 (PTD 1), Japanese Patent Laying-Open No. 11-78766 (PTD 2), and WO2010/079710 (PTD 3) disclose specific structures of the cylinder type gas generator constructed as above. These publications each disclose a cylinder type gas generator in which a space in a housing is divided into a combustion chamber accommodating a gas generating agent and a filter chamber accommodating a filter by arranging a partition member in an elongated cylindrical housing having opposing ends closed.

CITATION LIST

Patent Document

PTD 1: Japanese Patent Laying-Open No. 2005-313812
PTD 2: Japanese Patent Laying-Open No. 11-78766
PTD 3: WO2010/079710

SUMMARY OF INVENTION

Technical Problem

A partition member serving as a partition between a combustion chamber and a filter chamber is required to function as a pressure bulkhead which can withstand thrust of a gas at a high temperature and a high pressure generated in the combustion chamber when a gas generator is activated and can maintain a high internal pressure in the combustion chamber. The partition member functioning as the pressure bulkhead also achieves prevention of break of a filter due to direct impingement of the gas at a high temperature and a high pressure on the filter.

When the partition member is assembled to the housing, it is important to design the gas generator such that no gap is provided between the partition member and the housing for reliable passage through the filter of the gas at a high temperature and a high pressure generated at the time of activation of the gas generator. In this regard, simply inserting a disc-shaped partition member in the housing is not sufficient to avoid production of a gap, in which case performance is significantly impaired.

In the gas generator disclosed in each of Japanese Patent Laying-Open No. 2005-313812 and Japanese Patent Laying-Open No. 11-78766, a prescribed position in a circumferential wall portion of the housing is caulked inward to axially fix the partition member inserted in the housing so that the above-described function is exhibited by the partition member and no gap is provided between the housing and the partition member.

When such a construction is adopted, however, it is necessary to separately subject the housing to caulking for attachment of the partition member or to form a partition member to a large thickness in order to prevent unintended deformation of the partition member supported only by the housing, which has posed difficulties in reduction in length, diameter, or weight of the gas generator. An operation for caulking is also relatively complicated, which also has been a factor for increase in manufacturing cost.

The gas generator disclosed in WO2010/079710 includes a partition member constituted of an annular plate portion and a cylindrical portion as the partition member, the annular plate portion of the partition member covering an axial end surface of a filter. The cylindrical portion of the partition member is inserted in a hollow portion of the filter and the cylindrical portion is decreased or increased in diameter such that an area of opening is varied as a distance from the annular plate portion is greater. Thus, intended deformation in the partition member and the filter in a portion adjacent thereto is achieved at the time of activation of the gas generator and the above-described function is thus exhibited. No gap is provided between the partition member and the filter in the portion adjacent thereto, and the housing.

Such a construction is more advantageous in reduction in length, diameter, or weight of the gas generator and in facilitation of manufacturing than the constructions disclosed in Japanese Patent Laying-Open No. 2005-313812 and Japanese Patent Laying-Open No. 11-78766 described above. Special working also of the filter in conformity with a shape of the cylindrical portion of the partition member, however, is required, and manufacturing cost disadvantageously increases in this aspect.

Therefore, the present invention was made to solve the above-described problems, and an object thereof is to provide a gas generator which can be reduced in size and weight and can allow significant reduction in manufacturing cost without lowering in performance.

Solution to Problem

A gas generator based on a first aspect of the present invention includes a housing, a partition member, and an igniter. The housing is formed from an elongated cylindrical member having opposing ends closed and contains a combustion chamber accommodating a gas generating agent and a filter chamber accommodating a filter. The partition member is inserted in the housing and axially divides a space in the housing into the combustion chamber and the filter chamber. The igniter serves to burn the gas generating agent and is assembled to the housing. The housing has in a portion defining the filter chamber, a gas discharge opening for discharging a gas to the outside. The filter is formed from a member having a hollow portion extending along an axial direction of the housing and reaching an axial end surface located on a side of the combustion chamber. The partition member has a partition portion opposed to the axial end surface of the filter, and the partition portion includes a first region which opens as a result of burning of the gas generating agent as being located to be opposed to the hollow portion and a second region which does not open in spite of burning of the gas generating agent as being annularly located to surround the first region so as to be opposed to a portion of the axial end surface of the filter except for the hollow portion. The second region is provided with a large-thickness portion constructed to be greater in thickness than the first region and at least opposed to an outer edge portion of the axial end surface of the filter. The large-thickness portion is gradually greater in thickness from an inner circumferential end portion toward an outer circumferential end portion.

In the gas generator based on the first aspect of the present invention, the partition member may further have a cylindrical portion extending from the outer circumferential end portion of the large-thickness portion along an inner circumferential surface of the housing toward the combustion chamber.

A gas generator based on a second aspect of the present invention includes a housing, a partition member; and an igniter. The housing is formed from an elongated cylindrical member having opposing ends closed and contains a combustion chamber accommodating a gas generating agent and a filter chamber accommodating a filter. The partition member is inserted in the housing and axially divides a space in the housing into the combustion chamber and the filter chamber. The igniter serves to burn the gas generating agent and is assembled to the housing. The housing has in a portion defining the filter chamber, a gas discharge opening for discharging a gas to the outside. The filter is formed from a member having a hollow portion extending along an axial direction of the housing and reaching an axial end surface located on a side of the combustion chamber. The partition member has a partition portion opposed to the axial end surface of the filter and a cylindrical portion extending from an outer circumferential end portion of the partition portion along an inner circumferential surface of the housing toward the combustion chamber, and the partition portion includes a first region which opens as a result of burning of the gas generating agent as being located to be opposed to the hollow portion and a second region which does not open in spite of burning of the gas generating agent as being annularly located to surround the first region so as to be opposed to a portion of the axial end surface of the filter except for the hollow portion. The second region is provided with a large-thickness portion constructed to be greater in thickness than the first region and at least opposed to an outer edge portion of the axial end surface of the filter.

In the gas generator based on the second aspect of the present invention, the large-thickness portion may be in a shape of an annular flat plate uniform in thickness.

In the gas generator based on the first and second aspects of the present invention, the entire second region may be formed from the large-thickness portion.

The gas generator based on the first and second aspects of the present invention may include a sealed container accommodating the gas generating agent, and in that case, the partition member is preferably formed from a part of the sealed container.

In the gas generator based on the first and second aspects of the present invention, preferably, the partition portion is fitted or loosely fitted to the housing.

In the gas generator based on the first and second aspects of the present invention, the partition portion may abut on the axial end surface of the filter.

In the gas generator based on the first and second aspects of the present invention, the filter may be made of an aggregate of metal wire rods or metal mesh materials.

In the gas generator based on the first and second aspects of the present invention, the partition member is preferably made of a molding composed of an aluminum alloy molded by using impact molding.

Advantageous Effects of Invention

According to the present invention, a gas generator which can be reduced in size and weight and can allow significant reduction in manufacturing cost without lowering in performance can be obtained.

BRIEF DESCRIPTION OF DRAWINGS

FIG. 1 is a schematic diagram of a cylinder type gas generator in Embodiment 1 of the present invention.

FIG. 2 is an enlarged cross-sectional view of a main portion of the cylinder type gas generator shown in FIG. 1.

FIG. 3 is an enlarged cross-sectional view of the main portion showing a state at the time when the cylinder type gas generator shown in FIG. 1 is activated.

FIG. 21 is an enlarged cross-sectional view of a main portion of a cylinder type gas generator in Embodiment 12 of the present invention.

FIG. 22 is an enlarged cross-sectional view of the main portion showing a state at the time when the cylinder type gas generator shown in FIG. 21 is activated.

DESCRIPTION OF EMBODIMENTS

Figure 4:
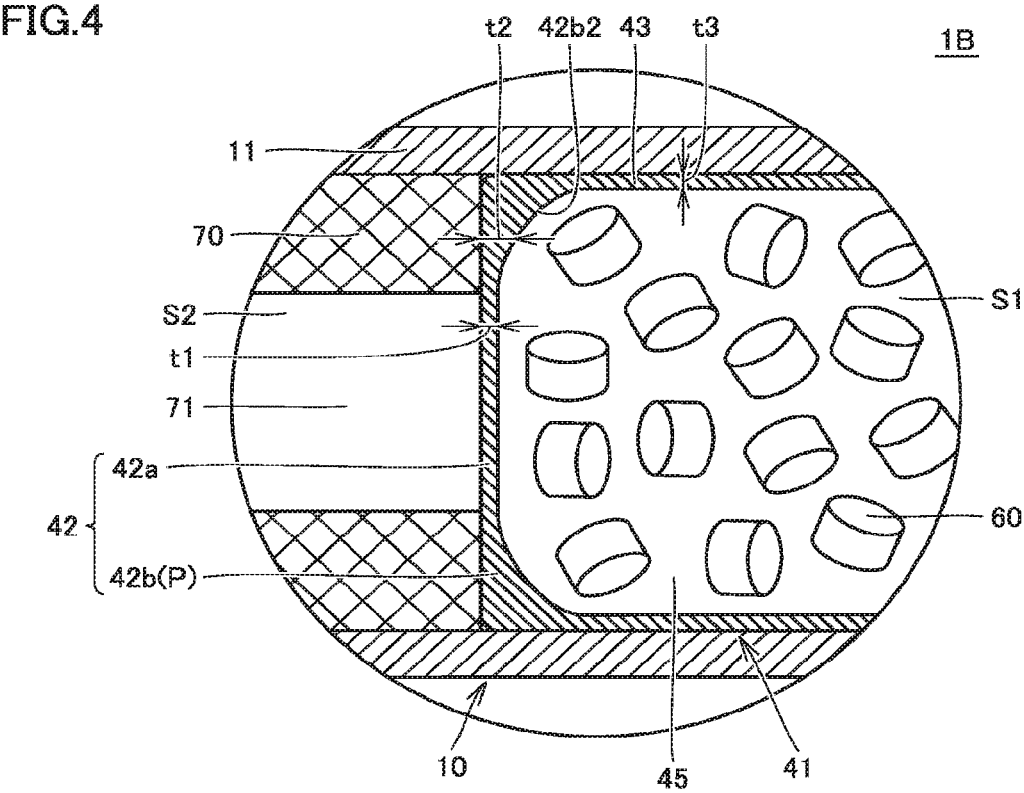
FIG. 4 is an enlarged cross-sectional view of a main portion of a cylinder type gas generator in Embodiment 2 of the present invention.

An embodiment of the present invention will be described hereinafter in detail with reference to the drawings. An embodiment shown below represents application of the present invention to a cylinder type gas generator incorporated in a side air bag apparatus. The same or common elements in embodiments shown below have the same reference characters allotted in the drawings and description thereof will not be repeated.

(Embodiment 1)

FIG. 1 is a schematic diagram of a cylinder type gas generator in Embodiment 1 of the present invention. A construction of a cylinder type gas generator 1A in the present embodiment will initially be described with reference to FIG. 1.

As shown in FIG. 1, cylinder type gas generator 1A in the present embodiment has an elongated columnar outer geometry and has a housing having closed one and the other end portions located in an axial direction. The housing includes a housing main body 10, a closing member 20, and an igniter assembly 30A. The housing constituted of housing main body 10, closing member 20, and igniter assembly 30A accommodates a sealed container 40, a gas generating agent 60, a cushion material 61, a coil spring 62, and a filter 70 which are internal constituent elements. In the housing, a combustion chamber S1 mainly accommodating gas generating agent 60 of the internal constituent elements described above and a filter chamber S2 accommodating filter 70 are located.

Housing main body 10 is formed from a member having an elongated cylindrical circumferential wall portion 11 having openings provided at opposing ends in the axial direction. Closing member 20 is formed from a disc-shaped member having a prescribed thickness and has an annular groove portion 21 for fixing by caulking which will be described later around its circumferential surface. Igniter assembly 30A includes a cylindrical holder 31 having a through portion 31a extending along a direction the same as the axial direction of housing main body 10 and holder 31 has an annular groove portion 31b for fixing by caulking which will be described later around its outer circumferential surface. Annular groove portions 21 and 31b for fixing by caulking are provided to extend along a circumferential direction in the circumferential surface of closing member 20 and the outer circumferential surface of holder 31, respectively.

Closing member 20 is fixed to housing main body 10 so as to close one opening end of housing main body 10. Specifically, with closing member 20 being inserted in one opening end of housing main body 10, circumferential wall portion 11 of housing main body 10 in a portion corresponding to annular groove portion 21 provided in the circumferential surface of closing member 20 is decreased in diameter radially inward and engaged with annular groove portion 21 so that closing member 20 is fixed by caulking to housing main body 10. One end portion in the axial direction of the housing is thus formed by closing member 20.

Igniter assembly 30A is fixed to housing main body 10 so as to close the other opening end of housing main body 10. Specifically, with igniter assembly 30A being inserted in the other opening end of housing main body 10, circumferential wall portion 11 of housing main body 10 in a portion corresponding to annular groove portion 31b provided in the outer circumferential surface of holder 31 of igniter assembly 30A is decreased in diameter radially inward and engaged with annular groove portion 31b so that igniter assembly 30A is fixed by caulking to housing main body 10. The other end portion in the axial direction of the housing is thus formed by igniter assembly 30A.

Such fixing by caulking is called omnidirectional caulking in which circumferential wall portion 11 of housing main body 10 is substantially uniformly decreased in diameter radially inward. With such omnidirectional caulking, caulking portions 13 and 14 are provided in circumferential wall portion 11 of housing main body 10 and caulking portions 13 and 14 are in intimate contact with respective annular groove portions 21 and 31b. Thus, a gap is prevented from being provided between housing main body 10 and closing member 20 and between housing main body 10 and igniter assembly 30A, and a space in the housing is sealed.

Housing main body 10 may be formed from a member made of a metal such as stainless steel, iron steel, an aluminum alloy, or a stainless alloy, from a press-formed product resulting from forming in a cylindrical shape by press-working of a rolled steel plate represented by SPCE, or from an electric resistance welded tube represented by STKM. In particular, when housing main body 10 is formed from a press-formed product of a rolled steel plate or an electric resistance welded tube, housing main body 10 can be formed more inexpensively and readily and with much lighter weight than when the housing main body is formed from a member made of a metal such as stainless steel or iron steel. Closing member 20 and holder 31 of igniter assembly 30A are formed from a member made of a metal such as stainless steel, iron steel, an aluminum alloy, or a stainless alloy.

Igniter assembly 30A includes an igniter 32 and a holding portion 33 formed from a resin molded portion, in addition to holder 31 described above. Igniter 32 is arranged in through portion 31a in holder 31 and holding portion 33 is located to bury a space between holder 31 and igniter 32.

Igniter 32 serves to burn gas generating agent 60 and is assembled to the other end portion described above in the axial direction of the housing as being supported by holder 31 with holding portion 33 being interposed. More specifically, igniter 32 includes an ignition portion 32a and a pair of terminal pins 32b. In ignition portion 32a, a resistor (bridge wire) is attached to be connected to the pair of terminal pins 32b, an ignition agent is loaded in ignition portion 32 so as to surround the resistor or to be in contact with the resistor, and an enhancer agent is also loaded as necessary.

Here, a Nichrome wire or a resistance wire made of an alloy containing platinum and tungsten is generally used as a resistor, and ZPP (zirconium potassium perchlorate), ZWPP (zirconium tungsten potassium perchlorate), lead tricinate, or the like is generally made use of as the ignition agent. A composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/ potassium nitrate/molybdenum trioxide is employed as the enhancer agent. A squib cup surrounding ignition portion 32a is generally made of a metal or a plastic.

Upon sensing collision, a prescribed amount of current flows in a resistor through terminal pin 32b. As the prescribed amount of current flows in the resistor, Joule heat is generated in the resistor and the ignition agent starts burning. Flame at a high temperature caused by burning bursts the squib cup accommodating the ignition agent. A time period from flow of a current in the resistor until activation of igniter 32 is generally not longer than 2 milliseconds in a case that the Nichrome wire is employed as the resistor.

Holding portion 33 is formed by injection molding (more particularly, insert molding) with the use of a mold, and formed by attaching an insulating fluid resin material to holder 31 and igniter 32 and solidifying the resin material. Igniter 32 is arranged to be inserted into through portion 31a in holder 31 in molding of holding portion 33 and fixed to holder 31 with holding portion 33 being interposed, as a result of feed of the fluid resin material described above so as to fill a space between holder 31 and igniter 32 in this state.

For a source material for holding portion 33 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of holding portion 33 after molding, glass fibers or the like are preferably contained as fillers in these resin materials. In a case where sufficient mechanical strength can be ensured only by a thermoplastic resin, however, a filler as described above does not have to be added.

A recess portion 33a is provided at an axial end portion of holding portion 33 so as to be exposed to the outside. Recess portion 33a provides a female connector portion which receives a male connector (not shown) of a harness for connecting igniter 32 and a control unit (not shown) to each other, and a portion close to a tip end of terminal pin 32b of igniter 32 is located as being exposed in recess portion 33a. A male connector is inserted in recess portion 33a serving as the female connector portion so that electrical conduction between a core of the harness and terminal pin 32b is achieved.

In the space in the housing, sealed container 40 is arranged in a space adjacent to a space where igniter assembly 30A is arranged. Sealed container 40 includes a cylindrical cup body 41 with bottom and a cap body 44 closing an opening of cup body 41, and is inserted in circumferential wall portion 11 of housing main body 10. In sealed container 40, cup body 41 and cap body 44 are combined and joined to each other so that an accommodation space 45 provided in sealed container 40 is hermetically sealed from the outside of sealed container 40.

Cup body 41 and cap body 44 are formed from a press-formed product made of a metal such as copper, aluminum, a copper alloy, or an aluminum alloy. Brazing, bonding, or tightening by winding (caulking) is suitably employed for joint between cup body 41 and cap body 44. Hermeticity can also further be enhanced by separately using a sealant in joint.

Cup body 41 of sealed container 40 is in a cylindrical shape with bottom as described above and includes a bottom portion 42 and a cylindrical portion 43. Bottom portion 42 is located to axially divide the space in the housing and cylindrical portion 43 extends from an outer circumferential end portion of bottom portion 42 along an inner circumferential surface of housing main body 10 toward igniter assembly 30A.

In cylinder type gas generator 1A in the present embodiment, cup body 41 which is a part of sealed container 40 functions as a partition member axially dividing the space in the housing into combustion chamber S1 and filter chamber S2, and a detailed construction and functions thereof will be described later.

Sealed container 40 including cup body 41 serving as the partition member is fitted or loosely fitted to circumferential wall portion 11 of housing main body 10, and circumferential wall portion 11 of housing main body 10 has not been subjected to caulking for fixing of sealed container 40. Fitting includes what is called press-fitting and refers to such a state that the outer circumferential surface of sealed container 40 is attached to the inner circumferential surface of circumferential wall portion 11 as being in contact therewith. Loose fitting refers to a state that the outer circumferential surface of sealed container 40 and the inner circumferential surface of circumferential wall portion 11 are not necessarily in contact with each other around the entire circumference but the sealed container is inserted with a slight gap (play) being interposed. From a point of view of facilitation in assembly, sealed container 40 is preferably loosely fitted to circumferential wall portion 11 of housing main body 10.

Gas generating agent 60 and cushion material 61 are accommodated in accommodation space 45 of sealed container 40. More specifically, cushion material 61 is arranged at an end portion of sealed container 40 on a side where igniter assembly 30A is located, and gas generating agent 60 is arranged in a portion except for a portion where cushion material 61 is arranged.

Gas generating agent 60 is an agent which is ignited by thermal particles generated as a result of activation of igniter 32 and produces a gas as it burns. A non-azide-based gas generating agent is preferably employed as gas generating agent 60, and gas generating agent 60 is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of. In addition, as the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. Moreover, as the additive, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. In addition, as the combustion modifier, a metal oxide, ferrosilicon, activated carbon, graphite, or the like can suitably be made use of.

A shape of a molding of gas generating agent 60 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which cylinder type gas generator 1A is incorporated, and for example, a shape optimal for the specifications is preferably selected by selecting a shape allowing change over time of a rate of generation of a gas during burning of gas generating agent 60. Furthermore, in addition to a shape of gas generating agent 60, a size of a molding or an amount thereof for filling is preferably selected as appropriate, in consideration of a linear burning velocity, a pressure exponent, or the like of gas generating agent 60.

Cushion material 61 is provided for the purpose of preventing gas generating agent 60 made of a molding from being crushed by vibration or the like, and suitably made of a molding of ceramic fibers, rock wool, a foamed resin (such as foamed silicone, foamed polypropylene, or foamed polyethylene), or rubber represented by chloroprene and EPDM. Cushion material 61 opens or splits due to thermal particles produced as a result of activation of igniter 32 and is burnt down in some cases. Instead of cushion material 61, for example, a coil spring can also be made use of. In that case, gas generating agent 60 made of a molding can properly be pressed against bottom portion 42 of cup body 41 by providing a coil spring including a pressing portion 62b (see FIG. 12) as shown in Embodiment 7 of the present invention which will be described later.

A coil spring 62 is arranged between holder 31 of igniter assembly 30A and sealed container 40 so as to surround ignition portion 32a of igniter 32. Coil spring 62 is a member for fixing sealed container 40 and filter 70 in the axial direction in the housing, and at the same time, it is a member for absorbing variation in axial length of these constituent elements. Therefore, coil spring 62 is fixed as lying between sealed container 40 and holder 31 in the axial direction of housing main body 10. Instead of coil spring 62, for example, a member similar to cushion material 61 may form such member for fixing sealed container 40 and filter 70.

In the space in the housing, filter 70 is arranged in a space adjacent to the space where sealed container 40 is arranged, which is located between sealed container 40 and closing member 20. Filter 70 is formed from a cylindrical member having a hollow portion 71 extending in a direction the same as the axial direction of housing main body 10, has axial one end surface abutting on closing member 20, and has axial the other end surface abutting on bottom portion 42 of sealed container 40.

Filter 70 functions as cooling means for cooling a gas by depriving the gas of heat at a high temperature of the gas when the gas produced as a result of burning of gas generating agent 60 passes through this filter 70 and also functions as removal means for removing slag (residues) or the like contained in the gas. As described above, by making use of filter 70 formed from a cylindrical member, a flow resistance against a gas which flows through filter chamber S2 at the time of activation is suppressed and an efficient flow of the gas can be achieved.

A filter formed from an aggregate of metal wire rods or metal mesh materials suitably made of stainless steel or iron steel can be made use of as filter 70. Specifically, a wire gauze of stocking stitch, a plain-woven wire gauze, an aggregate of crimped metal wire rods, or a material obtained by compressing the former with the use of a press is made use of. Alternatively, a material obtained by winding a perforated metal plate can also be made use of. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like can be made use of.

In circumferential wall portion 11 of housing main body 10 in a portion defining filter chamber S2, a plurality of gas discharge openings 12 are provided along the circumferential direction and the axial direction of circumferential wall portion 11. The plurality of gas discharge openings 12 serve to guide a gas which has passed through filter 70 to the outside of the housing.

FIG. 2 is an enlarged cross-sectional view of a main portion of a region II shown in FIG. 1 of the cylinder type gas generator shown in FIG. 1. A detailed construction of cup body 41 serving as the partition member of cylinder type gas generator 1A in the present embodiment will now be described with reference to FIG. 2.

As described above, in cylinder type gas generator 1A in the present embodiment, cup body 41 which is a part of sealed container 40 functions as the partition member. More specifically, as shown in FIG. 2, bottom portion 42 of cup body 41 is located to axially divide the space in the housing and bottom portion 42 functions as the partition portion.

Bottom portion 42 serving as the partition portion includes a first region 42a opposed to hollow portion 71 of filter 70 and a second region 42b annularly located to surround first region 42a as abutting on a portion of the axial end surface of filter 70 located on the side of combustion chamber S1 except for hollow portion 71 and being opposed thereto. Hollow portion 71 of filter 70 is thus covered with first region 42a and the axial end surface of the portion of filter 70 except for hollow portion 71 is covered with second region 42b.

First region 42a is formed to be relatively small in thickness t1 and second region 42b is formed to be relatively large in thickness t2. In the present embodiment, thickness t2 of second region 42b is formed to be greater in its entirety than thickness t1 of first region 42a. Therefore, when bottom portion 42 serving as the partition portion and filter 70 are projected along the axial direction of housing main body 10 on a surface orthogonal to the axial direction, a boundary between a portion small in thickness and a portion large in thickness of bottom portion 42 serving as the partition portion is superimposed on an inner edge of the portion of filter 70 except for hollow portion 71 (that is, an outer edge of hollow portion 71).

Thus, when the boundary between the portion small in thickness and the portion large in thickness of bottom portion 42 serving as the partition portion matches with the inner edge of the portion of filter 70 except for hollow portion 71, the entire second region 42b is provided as a large-thickness portion P constructed to be greater in thickness than first region 42a and large-thickness portion P is located as being opposed to the outer edge portion of filter 70 on the side of combustion chamber S1.

Second region 42b is constructed to gradually be greater in thickness t2 from an inner circumferential end portion toward an outer circumferential end portion. Thus, second region 42b has an annular inclined surface 42b1 in a portion facing accommodation space 45 and an inner space defined by second region 42b is gradually tapered from the side of combustion chamber S1 toward filter chamber S2.

First region 42a is formed to sufficiently be small in thickness such that it bursts or melts as a result of burning of gas generating agent 60, and thickness t1 is, for example, not smaller than 0.1 [mm] and not greater than 1.0 [mm]. Second region 42b is formed to have a thickness greater than thickness t1 of first region 42a, and thickness t2 is, for example, not smaller than 0.4 [mm] and not greater than 4.0 [mm] in a portion greatest in thickness. In the present embodiment, thickness t1 of first region 42a is set to 0.2 [mm] and thickness t2 of second region 42b is set to 2.0 [mm] in a portion greatest in thickness.

In the present embodiment, cylindrical portion 43 of cup body 41 extending from the outer circumferential end portion of bottom portion 42 serving as the partition portion is formed to have a thickness t3 relatively smaller than thickness t2 of second region 42b. Thickness t3 of cylindrical portion 43 is preferably comparable to thickness t1 of first region 42a described above, and it is, for example, not smaller than 0.1 [mm] and not greater than 1.0 [mm] and it is set to 0.2 [mm] in the present embodiment.

Cup body 41 constructed as above can be formed, for example, from a molding made of an aluminum alloy. Specifically, cup body 41 constructed as above can inexpensively and readily be fabricated by making use of deep-drawing (what is called impact molding) making use of such a phenomenon that slug (a lump of an aluminum alloy) extends upward along a punch by giving an impact with the punch to slug employed as a material.

FIG. 3 is an enlarged cross-sectional view of the main portion showing a state at the time when the cylinder type gas generator shown in FIG. 1 is activated. An operation of cylinder type gas generator 1A in the present embodiment when it is activated will now be described with reference to FIG. 3 and FIG. 1 described previously.

Referring to FIG. 1, when a vehicle on which cylinder type gas generator 1A in the present embodiment is mounted collides, collision is sensed by collision sensing means separately provided in the vehicle and igniter 32 is activated based thereon by current feed caused by a control unit separately provided in the vehicle.

When igniter 32 is activated, an ignition agent or an enhancer agent in addition thereto burns, so that a pressure in ignition portion 32a increases, ignition portion 32a thus bursts, and thermal particles flow out of ignition portion 32a. The thermal particles which have flowed out burst or melt cap body 44 of sealed container 40 and reach cushion material 61. The thermal particles which have reached cushion material 61 burn cushion material 61 and open or split the cushion material, and thus the thermal particles reach gas generating agent 60.

The thermal particles which have reached gas generating agent 60 burn gas generating agent 60 and thus a large amount of gas is generated. Accordingly, a pressure and a temperature in combustion chamber S1 increase and first region 42a in bottom portion 42 of cup body 41 bursts or melts as shown in FIG. 3 and thus a part of bottom portion 42 opens. Second region 42b and cylindrical portion 43 do not burst or melt (that is, do not open) but remain. The reason why cylindrical portion 43 does not burst or melt in spite of being comparable in thickness to first region 42a is that cylindrical portion 43 comes in intimate contact with circumferential wall portion 11 of housing main body 10 with increase in pressure in combustion chamber S1 and accordingly heat of cylindrical portion 43 positively conducts to circumferential wall portion 11.

Thrust of the gas generated in combustion chamber S1 is strongly applied to annular inclined surface 42b1 described above of second region 42b which remains. Since the thrust is applied not only in the axial direction (that is, a direction shown with an arrow A1 in the figure) but also in a radial direction (that is, a direction shown with an arrow A2 in the figure) to second region 42b as shown in FIG. 3, second region 42b is not only strongly pressed against the axial end surface of filter 70 but also strongly pressed against the inner circumferential surface of housing main body 10 as a result of deformation as spreading radially outward, and thus it is in intimate contact therewith.

Thus, the gas generated in combustion chamber S1 flows into filter chamber S2 through a communication hole resulting from disappearance of first region 42a as shown with an arrow G in FIG. 3. As second region 42b is strongly pressed against the axial end surface of filter 70, not only the second region is supported by filter 70 but also strongly pressed against the inner circumferential surface of housing main body 10. Then, reaction force thereof is applied as braking force which prevents movement of second region 42b, so that second region 42b functions as a pressure bulkhead which maintains an internal pressure in combustion chamber S1. Since second region 42b is in intimate contact with the inner circumferential surface of housing main body 10, no gap is provided between second region 42b and housing main body 10 and leakage of the gas through this portion can also be prevented.

A boundary portion between second region 42b and cylindrical portion 43 different from each other in thickness is more likely to break than other portions. Even when that portion breaks, however, large-thickness portion P relatively large in thickness is located between that portion and the axial end surface of filter 70 and large-thickness portion P is in intimate contact with the inner circumferential surface of housing main body 10 as described above. Therefore, no gas leaks through that portion.

The gas which has flowed into filter chamber S2 flows along the axial direction through hollow portion 71 of filter 70, thereafter changes a direction to the radial direction, and passes through filter 70. The gas is cooled as it is deprived of heat by filter 70 and slag contained in the gas is removed by filter 70.

The gas which has passed through filter 70 is discharged to the outside of the housing through gas discharge opening 12. The discharged gas is introduced into an air bag provided adjacently to cylinder type gas generator 1A to thereby expand and develop the air bag.

By adopting the construction as in cylinder type gas generator 1A in the present embodiment described above, since bottom portion 42 of cup body 41 serving as the partition portion properly exhibits a function as a pressure bulkhead at the time of activation, an internal pressure in combustion chamber S1 can sufficiently be increased, gas generating agent 60 burns continually in a stable manner, and desired gas output can be obtained.

By adopting the construction, since leakage of the gas from between bottom portion 42 of cup body 41 serving as the partition portion and housing main body 10 is also unlikely, the gas at a high temperature and a high pressure can reliably be discharged from gas discharge opening 12 through filter 70 and there is no possibility of impairment of performance either.

By adopting the construction, it is not necessary to subject housing main body 10 to caulking for attachment of cup body 41 serving as the partition portion, it is not necessary either to subject filter 70 to special working, and bottom portion 42 of cup body 41 serving as the partition portion can also sufficiently be small in thickness. Therefore, not only an assembly operation is significantly facilitated but also inexpensive manufacturing is allowed and reduction in length, diameter, or weight can be achieved in the cylinder type gas generator as a whole as compared with a conventional example.

Therefore, by adopting the construction as in the present embodiment, a cylinder type gas generator which can be reduced in size and weight and can allow significant reduction in manufacturing cost without lowering in performance can be obtained.

In the present embodiment, since the axial end surface of the portion of filter 70 except for hollow portion 71 is entirely covered with second region 42b provided as large-thickness portion P, a gas at a high temperature and a high pressure can be prevented from directly impinging on filter 70, and break of filter 70 can also be prevented.

In the present embodiment, since the partition member functioning as the pressure bulkhead is formed from a part of sealed container 40, it is not necessary to separately provide a partition member either, not only the number of parts can be reduced but also the number of man-hours in assembly can be reduced, and a cylinder type gas generator can more easily and inexpensively be manufactured.

(Embodiment 2)

FIG. 4 is an enlarged cross-sectional view of a main portion of a cylinder type gas generator in Embodiment 2 of the present invention. A cylinder type gas generator 1B in the present embodiment will be described below with reference to FIG. 4.

As shown in FIG. 4, cylinder type gas generator 1B in the present embodiment is different from cylinder type gas generator 1A in Embodiment 1 described above only in shape of second region 42b provided in bottom portion 42 of cup body 41 serving as the partition portion. Specifically, cylinder type gas generator 1B in the present embodiment is constructed such that second region 42b has an annular curved surface 42b2 in the portion facing accommodation space 45 as a result of adjustment of thickness t2 of second region 42b.

With such a construction as well, thrust of a gas generated in combustion chamber S1 is applied not only in the axial direction but also in the radial direction to annular curved surface 42b2 of second region 42b which remains without bursting and melting at the time of activation. Therefore, second region 42b deforms as spreading radially outward and comes in intimate contact with the inner circumferential surface of housing main body 10.

Therefore, with cylinder type gas generator 1B in the present embodiment as well, an effect the same as the effect described in Embodiment 1 described above can be obtained, reduction in size and weight can be achieved without lowering in performance, and manufacturing cost can significantly be suppressed.

(Embodiment 3)

Figure 5:
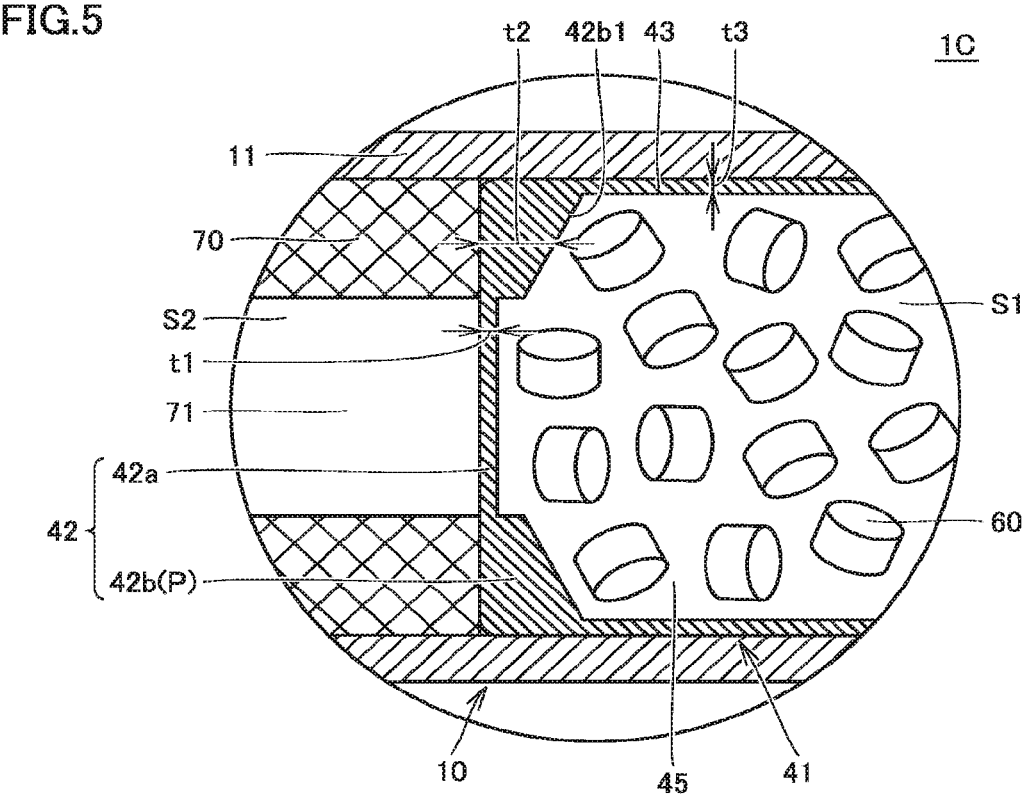
FIG. 5 is an enlarged cross-sectional view of a main portion of a cylinder type gas generator in Embodiment 3 of the present invention.

FIG. 5 is an enlarged cross-sectional view of a main portion of a cylinder type gas generator in Embodiment 3 of the present invention. A cylinder type gas generator 1C in the present embodiment will be described below with reference to FIG. 5.

As shown in FIG. 5, cylinder type gas generator 1C in the present embodiment is different from cylinder type gas generator 1A in Embodiment 1 described above only in shape of second region 42b provided in bottom portion 42 of cup body 41 serving as the partition portion. Specifically, cylinder type gas generator 1C in the present embodiment is constructed such that a step portion is formed between second region 42b and first region 42a as a result of adjustment of thickness t2 of second region 42b.

With such a construction as well, thrust of a gas generated in combustion chamber S1 is applied not only in the axial direction but also in the radial direction to annular inclined surface 42b1 of second region 42b which remains without bursting and melting at the time of activation. Therefore, second region 42b deforms as spreading radially outward and comes in intimate contact with the inner circumferential surface of housing main body 10. Furthermore, since the entire second region 42b can be provided as large-thickness portion P sufficiently greater in thickness than first region 42a, second region 42b can be less likely to burst and melt at the time of activation.

Therefore, with cylinder type gas generator 1C in the present embodiment as well, an effect the same as the effect described in Embodiment 1 described above can be obtained, reduction in size and weight can be achieved without lowering in performance, and manufacturing cost can significantly be suppressed.

(Embodiment 4)

Figure 6:
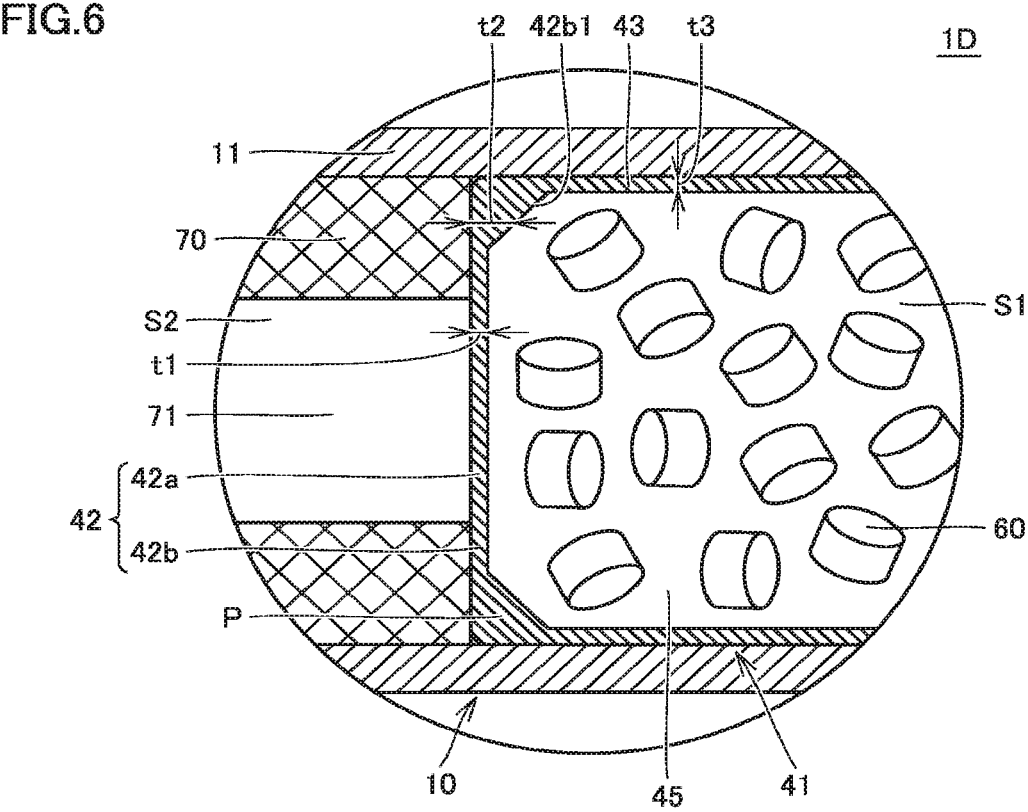
FIG. 6 is an enlarged cross-sectional view of a main portion of a cylinder type gas generator in Embodiment 4 of the present invention.
Figure 7:
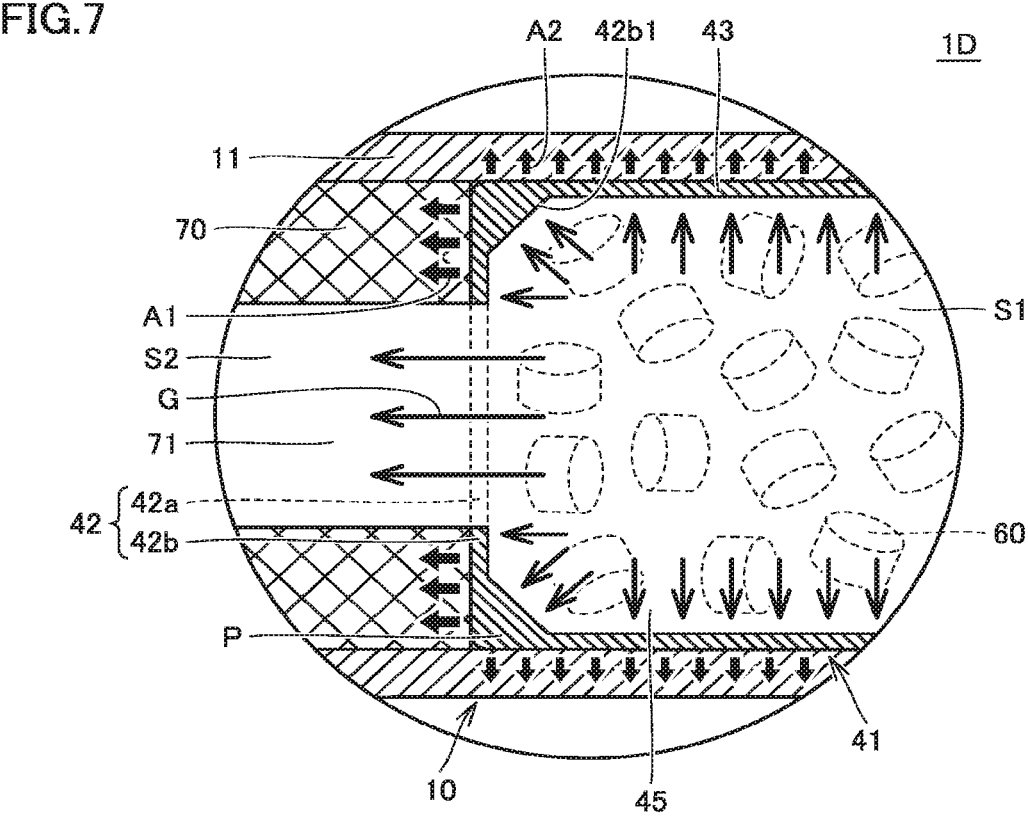
FIG. 7 is an enlarged cross-sectional view of the main portion showing a state at the time when the cylinder type gas generator shown in FIG. 6 is activated.

FIG. 6 is an enlarged cross-sectional view of a main portion of a cylinder type gas generator in Embodiment 4 of the present invention and FIG. 7 is an enlarged cross-sectional view of the main portion showing a state at the time when the cylinder type gas generator shown in FIG. 6 is activated. A cylinder type gas generator 1D in the present embodiment will be described below with reference to FIGS. 6 and 7.

As shown in FIG. 6, cylinder type gas generator 1D in the present embodiment is different from cylinder type gas generator 1A in Embodiment 1 described above only in shape of bottom portion 42 of cup body 41 serving as the partition portion. Specifically, in cylinder type gas generator 1D in the present embodiment, a boundary between the portion small in thickness and the portion large in thickness of bottom portion 42 serving as the partition portion does not match with the inner edge of the portion of filter 70 except for hollow portion 71, and bottom portion 42 serving as the partition portion is arranged at a position intermediate between the inner edge and the outer edge of that portion. In this case, though large-thickness portion P constructed to be greater in thickness than first region 42a is provided only at a position in second region 42b closer to the outer circumferential end portion, large-thickness portion P is located to be opposed to the outer edge portion of filter 70 on the side of combustion chamber S1.

With such a construction as well, as shown in FIG. 7, thrust of a gas generated in combustion chamber S1 is applied not only in the axial direction but also in the radial direction to annular inclined surface 42b1 of second region 42 which remains without bursting and melting at the time of activation. Therefore, second region 42b (more strictly, large-thickness portion P) deforms as spreading radially outward and comes in intimate contact with the inner circumferential surface of housing main body 10.

Therefore, with cylinder type gas generator 1D in the present embodiment as well, an effect comparable to the effect described in Embodiment 1 described above can be obtained, reduction in size and weight can be achieved without lowering in performance, and manufacturing cost can significantly be suppressed.

When such a construction is adopted, as shown in FIG. 7, a portion of second region 42b described above which is comparable in thickness to first region 42a (that is, a portion of second region 42b except for large-thickness portion P) remains without bursting and melting at the time of activation. The reason why that portion does not burst and melt in spite of being comparable in thickness to first region 42a is that this portion comes in contact with filter 70 and is supported by filter 70 and accordingly heat of that position positively conducts to filter 70. Therefore, when such a construction is adopted as well, the portion of the axial end surface of filter 70 located on the side of combustion chamber S1 except for hollow portion 71 is covered with second region 42b at the time of activation and hence break of filter 70 can be prevented.

(Embodiment 5)

Figure 8:
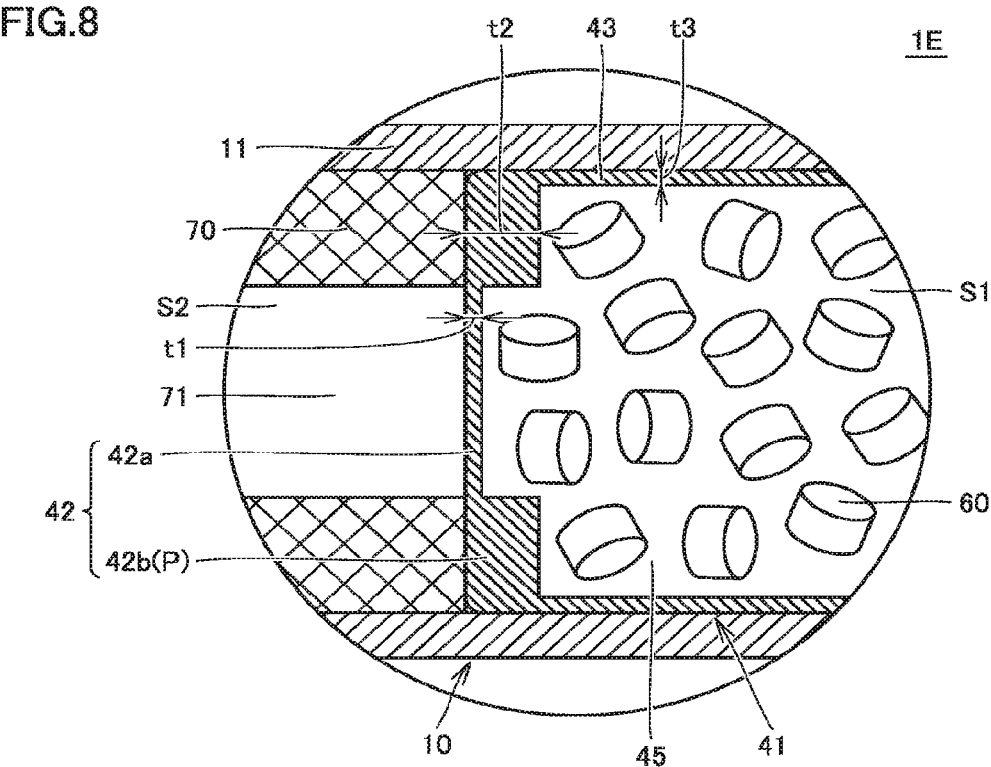
FIG. 8 is an enlarged cross-sectional view of a main portion of a cylinder type gas generator in Embodiment 5 of the present invention.
Figure 9:
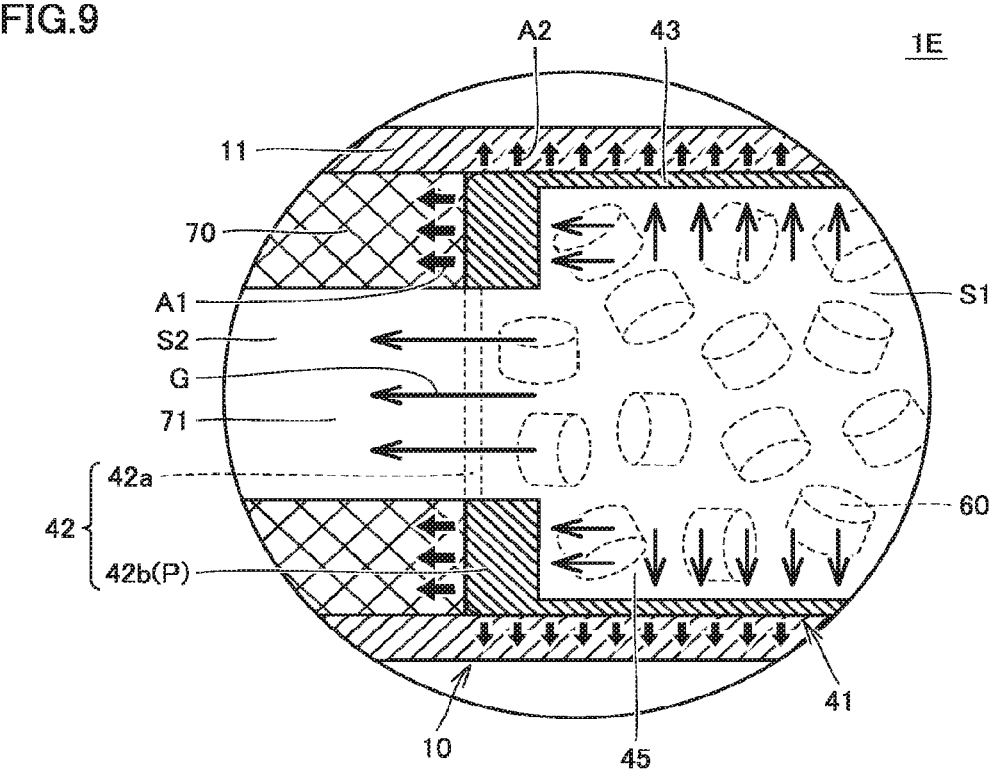
FIG. 9 is an enlarged cross-sectional view of the main portion showing a state at the time when the cylinder type gas generator shown in FIG. 8 is activated.

FIG. 8 is an enlarged cross-sectional view of a main portion of a cylinder type gas generator in Embodiment 5 of the present invention and FIG. 9 is an enlarged cross-sectional view of the main portion showing a state at the time when the cylinder type gas generator shown in FIG. 8 is activated. A cylinder type gas generator 1E in the present embodiment will be described below with reference to FIGS. 8 and 9.

As shown in FIG. 8, cylinder type gas generator 1E in the present embodiment is different from cylinder type gas generator 1A in Embodiment 1 described above only in shape of second region 42b provided in bottom portion 42 of cup body 41 serving as the partition portion. Specifically, in cylinder type gas generator 1E in the present embodiment, second region 42b is formed in a shape of an annular flat plate uniform in thickness t2, and thus the entire second region 42b is provided as large-thickness portion P constructed to be greater in thickness than first region 42a. In this case, an inner space defined by second region 42b is not gradually tapered from the side of combustion chamber S1 toward filter chamber S2 but is provided in a columnar shape.

With such a construction, as shown in FIG. 9, thrust of a gas generated in combustion chamber S1 is applied only in the axial direction to second region 42b which remains without bursting and melting at the time of activation, and thrust of the gas generated in combustion chamber S1 is applied in the radial direction to the inner circumferential surface of cylindrical portion 43 which remains without bursting and melting at the time of activation. Therefore, cylindrical portion 43 which is a portion continuous to second region 42b is strongly pressed against the inner circumferential surface of housing main body 10. Therefore, since cylindrical portion 43 of cup body 41 which is a part of the partition member is in intimate contact with the inner circumferential surface of housing main body 10, a gap can be prevented from being provided between these components, and leakage of the gas through that portion can be prevented.

The boundary portion between second region 42b and cylindrical portion 43 which are different from each other in thickness are more likely to break than other portions. Even if such a portion is broken, however, large-thickness portion P relatively large in thickness is located between that portion and the axial end surface of filter 70. Therefore, so long as large-thickness portion P abuts on circumferential wall portion 11 of housing main body 10, the gas will not leak through that portion.

Therefore, with cylinder type gas generator 1E in the present embodiment as well, an effect comparable to the effect described in Embodiment 1 described above can be obtained, reduction in size and weight can be achieved without lowering in performance, and manufacturing cost can significantly be suppressed.

(Embodiment 6)

Figure 10:
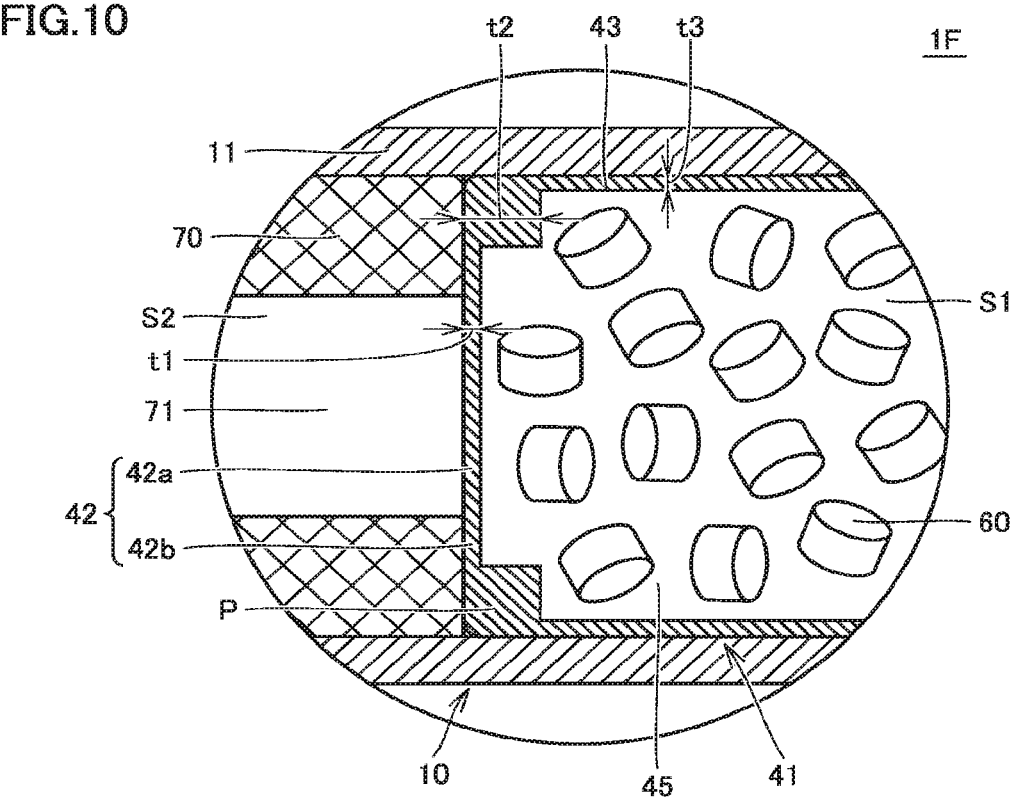
FIG. 10 is an enlarged cross-sectional view of a main portion of a cylinder type gas generator in Embodiment 6 of the present invention.
Figure 11:
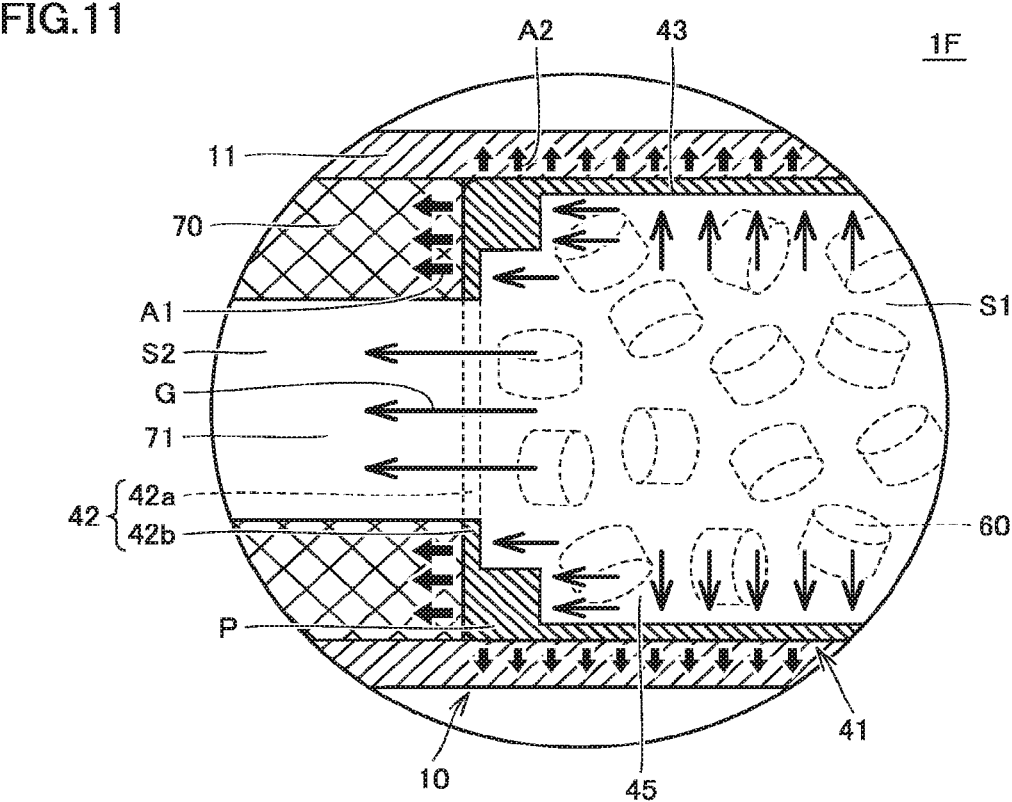
FIG. 11 is an enlarged cross-sectional view of the main portion showing a state at the time when the cylinder type gas generator shown in FIG. 10 is activated.

FIG. 10 is an enlarged cross-sectional view of a main portion of a cylinder type gas generator in Embodiment 6 of the present invention and FIG. 11 is an enlarged cross-sectional view of the main portion showing a state at the time when the cylinder type gas generator shown in FIG. 10 is activated. A cylinder type gas generator 1F in the present embodiment will be described below with reference to FIGS. 10 and 11.

As shown in FIG. 10, cylinder type gas generator 1F in the present embodiment is different from cylinder type gas generator 1E in Embodiment 5 described above only in shape of bottom portion 42 of cup body 41 serving as the partition portion. Specifically, in cylinder type gas generator 1F in the present embodiment, a boundary between the portion small in thickness and the portion large in thickness of bottom portion 42 serving as the partition portion does not match with the inner edge of the portion of filter 70 except for hollow portion 71, and bottom portion 42 serving as the partition portion is arranged at a position intermediate between the inner edge and the outer edge of the portion. In this case, though large-thickness portion P constructed to be greater in thickness than first region 42a is provided only at a position in second region 42b closer to the outer circumferential end portion, large-thickness portion P is located to be opposed to the outer edge portion of filter 70 on the side of combustion chamber S1.

With such a construction as well, as shown in FIG. 11, thrust of a gas generated in combustion chamber S1 is applied in the radial direction to the inner circumferential surface of cylindrical portion 43 which remains without bursting and melting at the time of activation. Therefore, cylindrical portion 43 which is a portion continuous to second region 42b is strongly pressed against the inner circumferential surface of housing main body 10 and in intimate contact therewith.

Therefore, with cylinder type gas generator 1F in the present embodiment as well, an effect comparable to the effect described in Embodiment 5 described above can be obtained, reduction in size and weight can be achieved without lowering in performance, and manufacturing cost can significantly be suppressed.

When such a construction is adopted, as shown in FIG. 11, a portion of second region 42b described above which is comparable in thickness to first region 42a (that is, a portion of second region 42b except for large-thickness portion P) remains without bursting and melting at the time of activation. The reason why that portion does not burst and melt in spite of being comparable in thickness to first region 42a is that this portion comes in contact with filter 70 and is supported by filter 70 and accordingly heat of that position positively conducts to filter 70. Therefore, when the construction is adopted as well, the portion of the axial end surface of filter 70 located on the side of combustion chamber S1 except for hollow portion 71 is covered with second region 42b at the time of activation, and hence break of filter 70 can be prevented.

(Embodiment 7)

Figure 12:
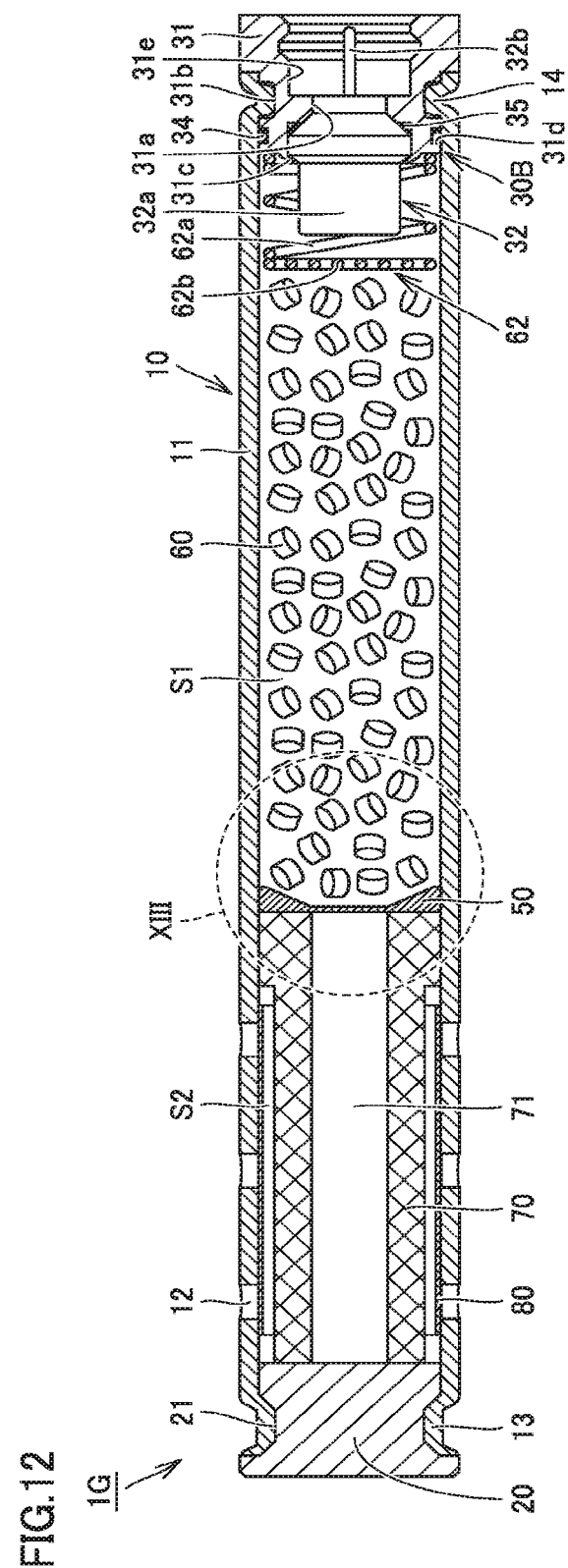
FIG. 12 is a schematic diagram of a cylinder type gas generator in Embodiment 7 of the present invention.

FIG. 12 is a schematic diagram of a cylinder type gas generator in Embodiment 7 of the present invention. A construction of a cylinder type gas generator 1G in the present embodiment will initially be described with reference to FIG. 12.

As shown in FIG. 12, cylinder type gas generator 1G in the present embodiment is different from cylinder type gas generator 1A in Embodiment 1 described above mainly in construction, that is, in that an igniter assembly 30B different in construction is provided, a partition member 50 is provided instead of sealed container 40, and coil spring 62 and filter 70 different in construction are provided.

Specifically, igniter assembly 30B includes holder 31, igniter 32, and a pair of sealing members 34 and 35.

Holder 31 is formed from a cylindrical member having through portion 31a extending along a direction the same as the axial direction of housing main body 10, and formed from a member made of a metal such as stainless steel, iron steel, an aluminum alloy, or a stainless alloy. Holder 31 has a caulking portion 31c for fixing of igniter 32 by caulking which will be described later to an end portion on a side facing a space in the housing. Holder 31 has an annular groove portion 31d at a prescribed position in its outer circumferential surface. In addition, a recess portion 31e serving as a female connector portion described above is provided in a portion of holder 31 exposed to the outside.

Igniter 32 is fixed by caulking as being inserted in through portion 31a of holder 31. More specifically, by caulking caulking portion 31c described above with igniter 32 being inserted in through portion 31a and abutting on holder 31, igniter 32 is clamped by and fixed to holder 31.

Annular groove portion 31d accommodates sealing member 34 formed from an O-ring or the like. Thus, sealing member 34 accommodated in annular groove portion 31d provided in holder 31 lies between holder 31 and circumferential wall portion 11 of housing main body 10 so that hermeticity of that portion is ensured.

Sealing member 35 formed from an O-ring or the like is interposed between igniter 32 and holder 31. Sealing member 35 serves to prevent a gap from being provided between igniter 32 and holder 31, and it hermetically seals the space in the housing.

In the space in the housing, partition member 50 is arranged at a position intermediate between closing member 20 and igniter assembly 30B by being inserted in housing main body 10. Partition member 50 is substantially in a shape of a disc, and it axially divides the space in the housing into combustion chamber S1 and filter chamber S2.

Partition member 50 is formed from a press-formed product made of a metal such as copper, aluminum, a copper alloy, or an aluminum alloy. Partition member 50 is fitted or loosely fitted to circumferential wall portion 11 of housing main body 10, and circumferential wall portion 11 of housing main body 10 has not been subjected to caulking for fixing of partition member 50.

In the space in the housing, gas generating agent 60 and coil spring 62 are arranged in a space (that is, combustion chamber S1) lying between igniter assembly 30B and partition member 50. Gas generating agent 60 is arranged at a position in the space on the side of partition member 50, and coil spring 62 is arranged between gas generating agent 60 and igniter assembly 30B.

Coil spring 62 is provided for the purpose of preventing gas generating agent 60 made of a molding from being crushed by vibration or the like, and has a spring portion 62a formed by bending a metal wire rod and a pressing portion 62b. Spring portion 62a is arranged such that one end thereof abuts on holder 31 of igniter assembly 30B and pressing portion 62b is formed at the other end. Pressing portion 62b is provided by arranging metal wire rods substantially in parallel to each other at a prescribed interval, and abuts on gas generating agent 60.

Thus, gas generating agent 60 is biased toward partition member 50 by coil spring 62 and prevented from moving in the housing. Instead of coil spring 62 as described above, a cushion material formed from a member made of a molding of ceramic fibers, rock wool, a foamed resin (such as foamed silicone, foamed polypropylene, or foamed polyethylene), or rubber represented by chloroprene and EPDM may be made use of.

In the space in the housing, filter 70 is arranged in the space (that is, filter chamber S2) lying between closing member 20 and partition member 50. Filter 70 is formed from a cylindrical member having hollow portion 71 extending in a direction the same as the axial direction of housing main body 10, and has axial one end surface abutting on closing member 20 and axial the other end surface abutting on partition member 50.

A portion of filter 70 facing gas discharge opening 12 is in a shape decreased in diameter radially inward, so that a prescribed gap is provided between that portion of filter 70 and housing main body 10. By providing the gap, a gas stays in this portion as being diffused and efficiency of use of filter 70 can be enhanced.

A sealing tape 80 is affixed to a main surface of circumferential wall portion 11 of housing main body 10 located on the side of filter 70 so as to close gas discharge opening 12. An aluminum foil in which a tacky member is applied to one surface is made use of as sealing tape 80. Hermeticity in the space in the housing is thus ensured.

Figure 13:
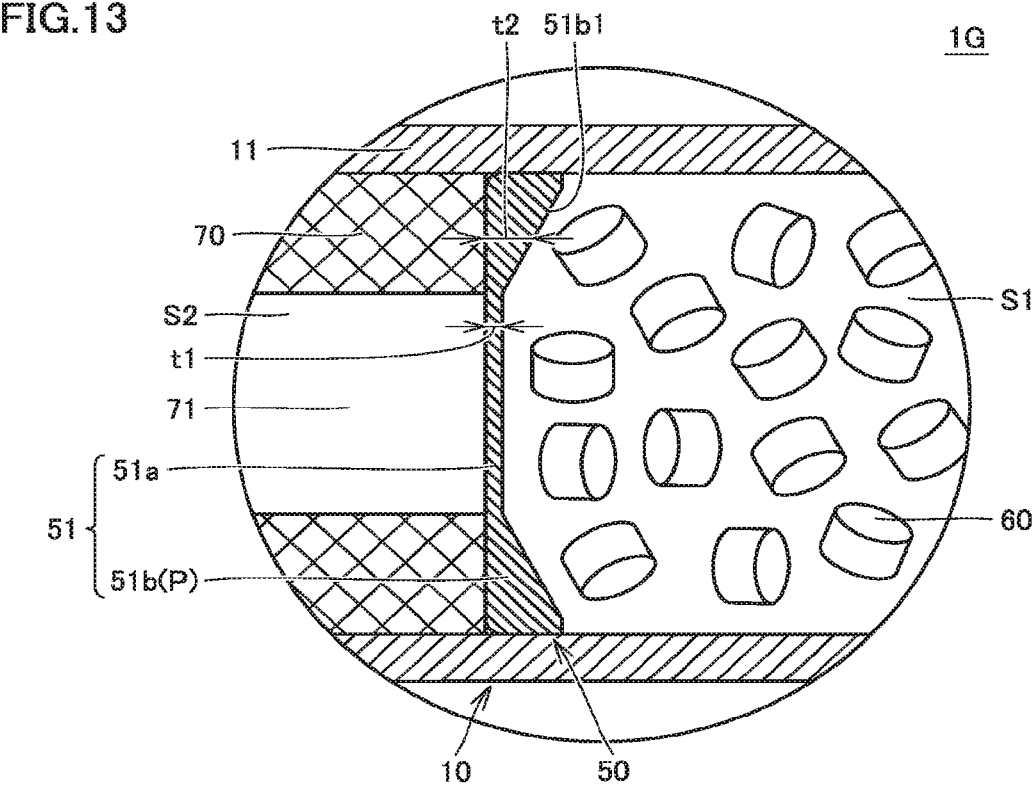
FIG. 13 is an enlarged cross-sectional view of a main portion of the cylinder type gas generator shown in FIG. 12.

FIG. 13 is an enlarged cross-sectional view of a main portion of a region XIII shown in FIG. 12 of the cylinder type gas generator shown in FIG. 12. A detailed construction of partition member 50 of cylinder type gas generator 1G in the present embodiment will now be described with reference to FIG. 12.

As shown in FIG. 13, partition member 50 is formed from partition portion 51 in a form of an annular plate. Partition portion 51 includes a first region 51a opposed to hollow portion 71 of filter 70 and a second region 51b annularly located to surround first region 51a as abutting on a portion of the axial end surface of filter 70 located on the side of combustion chamber S1 except for hollow portion 71 and being opposed thereto. Hollow portion 71 of filter 70 is thus covered with first region 51a and the axial end surface of filter 70 except for hollow portion 71 is covered with second region 51b.

First region 51a is formed to be relatively small in thickness t1 and second region 51b is formed to be relatively large in thickness t2. In the present embodiment, thickness t2 of second region 51b is formed to be greater in its entirety than thickness t1 of first region 51a. Therefore, when partition portion 51 and filter 70 are projected along the axial direction of housing main body 10 on a surface orthogonal to the axial direction, a boundary between a portion small in thickness and a portion large in thickness of partition portion 51 is superimposed on an inner edge of the portion of filter 70 except for hollow portion 71 (that is, an outer edge of hollow portion 71).

When the boundary between the portion small in thickness and the portion large in thickness of partition portion 51 matches with the inner edge of the portion of filter 70 except for hollow portion 71, the entire second region 51b is provided as large-thickness portion P constructed to be greater in thickness than first region 51a and large-thickness portion P is located as being opposed to the outer edge portion of filter 70 on the side of combustion chamber S1.

Second region 51b is constructed to gradually be greater in thickness t2 from the inner circumferential end portion toward the outer circumferential end portion. Thus, second region 51b has an annular inclined surface 51b1 in a portion facing combustion chamber S1 and an inner space defined by second region 51b is gradually tapered from the side of combustion chamber S1 toward filter chamber S2.

First region 51a is formed to sufficiently be small in thickness such that it bursts or melts as a result of burning of gas generating agent 60 and second region 51b is formed to have a thickness greater than thickness t1 of first region 51a. Thickness t1 of first region 51a and thickness t2 of the second region are comparable to those of first region 42a and second region 42b of bottom portion 42 of cup body 41 in Embodiment 1 described above, respectively.

Figure 14:
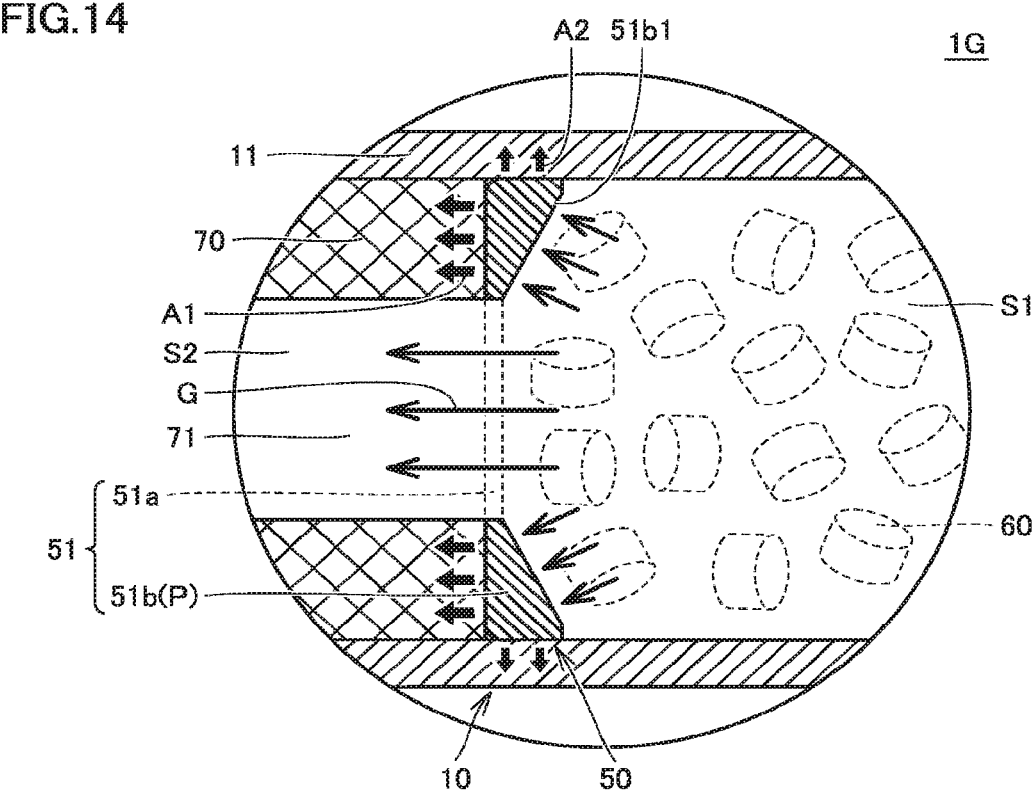
FIG. 14 is an enlarged cross-sectional view of the main portion showing a state at the time when the cylinder type gas generator shown in FIG. 12 is activated.

FIG. 14 is an enlarged cross-sectional view of a main portion showing a state at the time when the cylinder type gas generator shown in FIG. 12 is activated. An operation of cylinder type gas generator 1G in the present embodiment at the time of activation will now be described with reference to FIG. 14 and FIG. 12 described previously.

Referring to FIG. 12, when a vehicle on which cylinder type gas generator 1G in the present embodiment is mounted collides, collision is sensed by collision sensing means separately provided in the vehicle and igniter 32 is activated based thereon by current feed caused by a control unit separately provided in the vehicle.

When igniter 32 is activated, an ignition agent or an enhancer agent in addition thereto burns, so that a pressure in ignition portion 32a increases, ignition portion 32a thus bursts, and thermal particles flow out of ignition portion 32a. The thermal particles which have flowed out of ignition portion 32a reach gas generating agent 60.

The thermal particles which have reached gas generating agent 60 burn gas generating agent 60 and thus a large amount of gas is generated. Accordingly, a pressure and a temperature in combustion chamber S1 increase and first region 51a in partition portion 51 of partition member 50 bursts or melts as shown in FIG. 14 and thus a part of partition portion 51 opens. Second region 51b does not burst and melt (that is, does not open) but remains.

Thrust of the gas generated in combustion chamber S1 is strongly applied to annular inclined surface 51b1 described above of second region 51b which remains. Since the thrust is applied not only in the axial direction (that is, a direction shown with arrow A1 in the figure) but also in the radial direction (that is, a direction shown with arrow A2 in the figure) to second region 51b as shown in FIG. 14, second region 51b is not only strongly pressed against the axial end surface of filter 70 but also strongly pressed against the inner circumferential surface of housing main body 10 as a result of deformation as spreading radially outward, and thus it is in intimate contact therewith.

Thus, the gas generated in combustion chamber S1 flows into filter chamber S2 through a communication hole resulting from disappearance of first region 51a as shown with arrow G in FIG. 12. As second region 51b is strongly pressed against the axial end surface of filter 70, not only the second region is supported by filter 70 but also strongly pressed against the inner circumferential surface of housing main body 10. Then, reaction force thereof is applied as braking force which prevents movement of second region 51b, so that second region 51b functions as a pressure bulkhead which maintains an internal pressure in combustion chamber S1. Since second region 51b is in intimate contact with the inner circumferential surface of housing main body 10, no gap is provided between second region 51b and housing main body 10 and leakage of the gas through this portion can also be prevented.

The gas which has flowed into filter chamber S2 flows along the axial direction through hollow portion 71 of filter 70, thereafter changes a direction to the radial direction, and passes through filter 70. The gas is cooled as it is deprived of heat by filter 70 and slag contained in the gas is removed by filter 70.

As the pressure in filter chamber S2 is higher, sealing tape 80 which has closed gas discharge opening 12 is cleaved and the gas which has passed through filter 70 is discharged to the outside of the housing through gas discharge opening 12. The discharged gas is introduced into an air bag provided adjacently to cylinder type gas generator 1G to thereby expand and develop the air bag.

By adopting the construction as in cylinder type gas generator 1G in the present embodiment described above, since partition member 50 properly exhibits a function as a pressure bulkhead at the time of activation, an internal pressure in combustion chamber S1 can sufficiently be increased, gas generating agent 60 burns continually in a stable manner, and desired gas output can be obtained.

By adopting the construction, since leakage of the gas from between partition member 50 and housing main body 10 is also unlikely, the gas at a high temperature and a high pressure can reliably be discharged from gas discharge opening 12 through filter 70 and there is no possibility of impairment of performance either.

By adopting the construction, it is not necessary to subject housing main body 10 to caulking for attachment of partition member 50, it is not necessary either to subject filter 70 to special working, and partition member 50 can also sufficiently be small in thickness. Therefore, not only an assembly operation is significantly facilitated but also inexpensive manufacturing is allowed and reduction in length, diameter, or weight can be achieved in the cylinder type gas generator as a whole as compared with a conventional example.

Therefore, by adopting the construction as in the present embodiment, a cylinder type gas generator which can be reduced in size and weight and can allow significant reduction in manufacturing cost without lowering in performance can be obtained.

Furthermore, in the present embodiment, since the entire axial end surface of the portion of filter 70 except for hollow portion 71 is covered with second region 51*b* provided as large-thickness portion P, a gas at a high temperature and a high pressure can also be prevented from being directly impinging on filter 70 and break of filter 70 can also be prevented.

(Embodiment 8)

Figure 15:
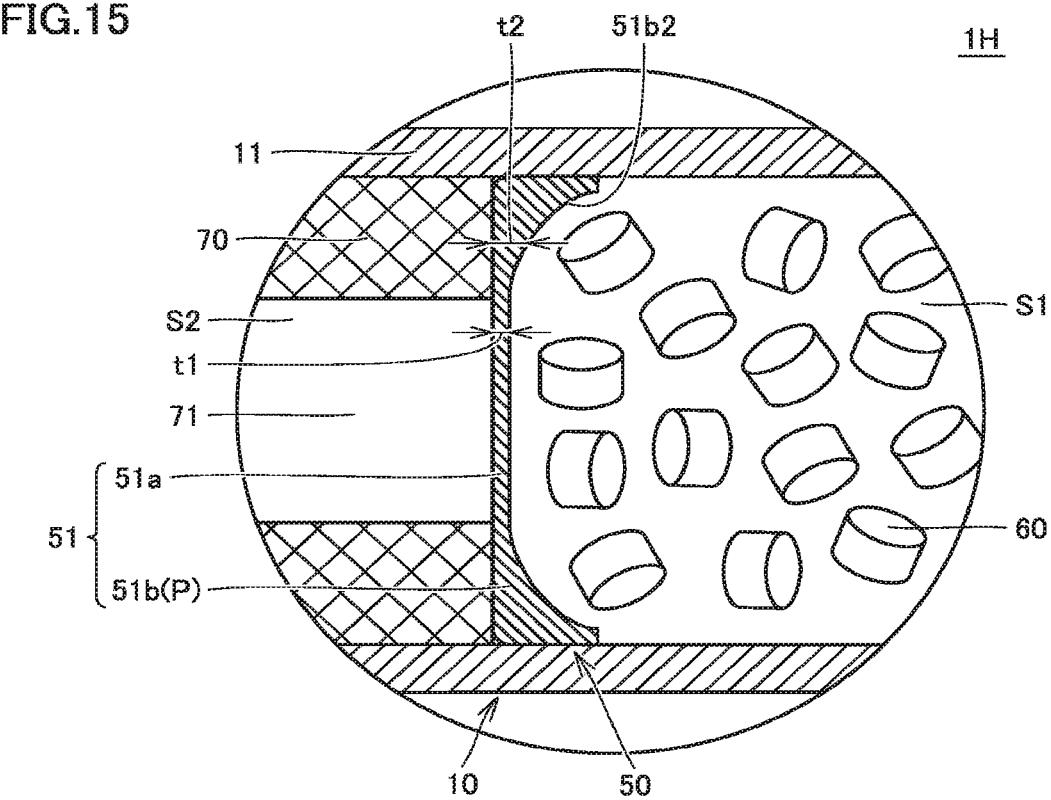
FIG. 15 is an enlarged cross-sectional view of a main portion of a cylinder type gas generator in Embodiment 8 of the present invention.

FIG. 15 is an enlarged cross-sectional view of a main portion of a cylinder type gas generator in Embodiment 8 of the present invention. A cylinder type gas generator 1H in the present embodiment will be described below with reference to FIG. 15.

As shown in FIG. 15, cylinder type gas generator 1H in the present embodiment is different from cylinder type gas generator 1G in Embodiment 7 described above only in shape of second region 51*b* provided in partition portion 51 of partition member 50. Specifically, in cylinder type gas generator 1H in the present embodiment, second region 51*b* has an annular curved surface 51*b*2 in a portion thereof facing combustion chamber S1 based on adjustment of thickness t2 of second region 51*b*.

With such a construction as well, thrust of a gas generated in combustion chamber S1 is applied not only in the axial direction but also in the radial direction to annular curved surface 51*b*2 of second region 51*b* which remains without bursting and melting at the time of activation. Therefore, second region 51*b* deforms as spreading radially outward and is in intimate contact with the inner circumferential surface of housing main body 10.

Therefore, with cylinder type gas generator 1H in the present embodiment as well, an effect the same as the effect described in Embodiment 7 described above can be obtained, reduction in size and weight can be achieved without lowering in performance, and manufacturing cost can significantly be suppressed.

(Embodiment 9)

Figure 16:
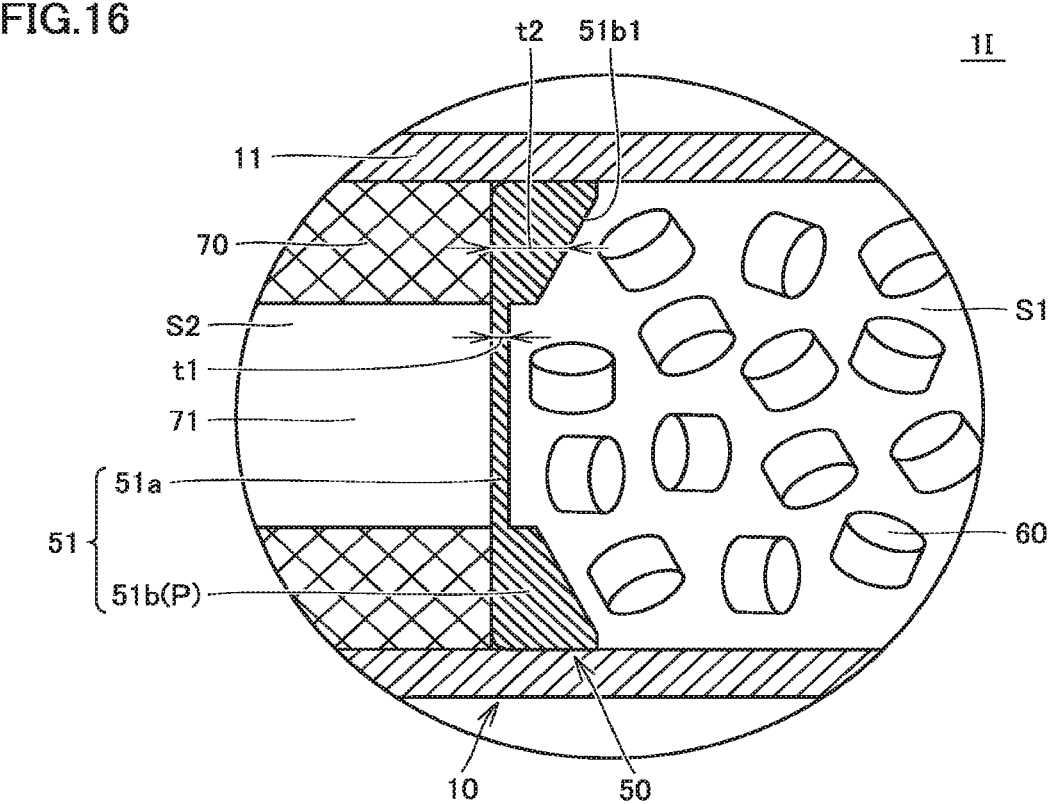
FIG. 16 is an enlarged cross-sectional view of a main portion of a cylinder type gas generator in Embodiment 9 of the present invention.

FIG. 16 is an enlarged cross-sectional view of a main portion of a cylinder type gas generator in Embodiment 9 of the present invention. A cylinder type gas generator 1I in the present embodiment will be described below with reference to FIG. 16.

As shown in FIG. 16, cylinder type gas generator 1I in the present embodiment is different from cylinder type gas generator 1G in Embodiment 7 described above only in shape of second region 51*b* provided in partition portion 51 of partition member 50. Specifically, cylinder type gas generator 1I in the present embodiment is constructed such that a step portion is formed between second region 51*b* and first region 51*a* as a result of adjustment of thickness t2 of second region 51*b*.

With such a construction as well, thrust of a gas generated in combustion chamber S1 is applied not only in the axial direction but also in the radial direction to annular inclined surface 51*b*1 of second region 51*b* which remains without bursting and melting at the time of activation. Therefore, second region 51*b* deforms as spreading radially outward and comes in intimate contact with the inner circumferential surface of housing main body 10. Furthermore, since the entire second region 51*b* can be constructed to be sufficiently greater in thickness than first region 51*a*, second region 51*b* can be less likely to burst and melt at the time of activation.

Therefore, with cylinder type gas generator 1I in the present embodiment as well, an effect the same as the effect described in Embodiment 7 described above can be obtained, reduction in size and weight can be achieved without lowering in performance, and manufacturing cost can significantly be suppressed.

(Embodiment 10)

Figure 17:
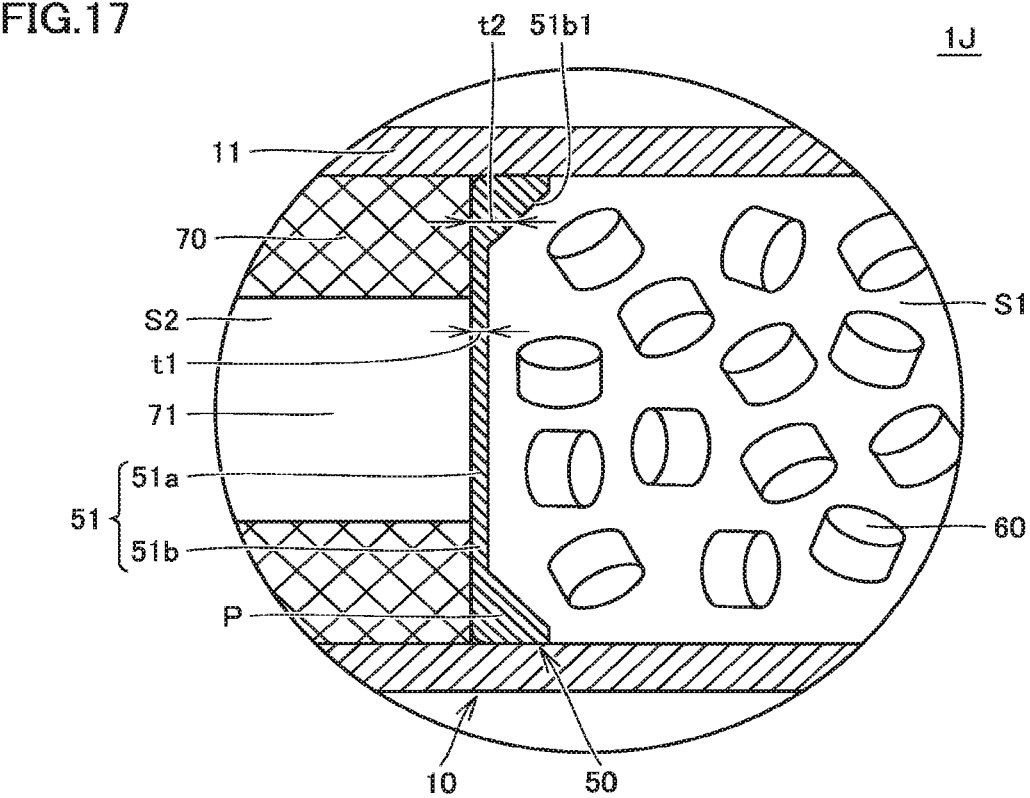
FIG. 17 is an enlarged cross-sectional view of a main portion of a cylinder type gas generator in Embodiment 10 of the present invention.
Figure 18:
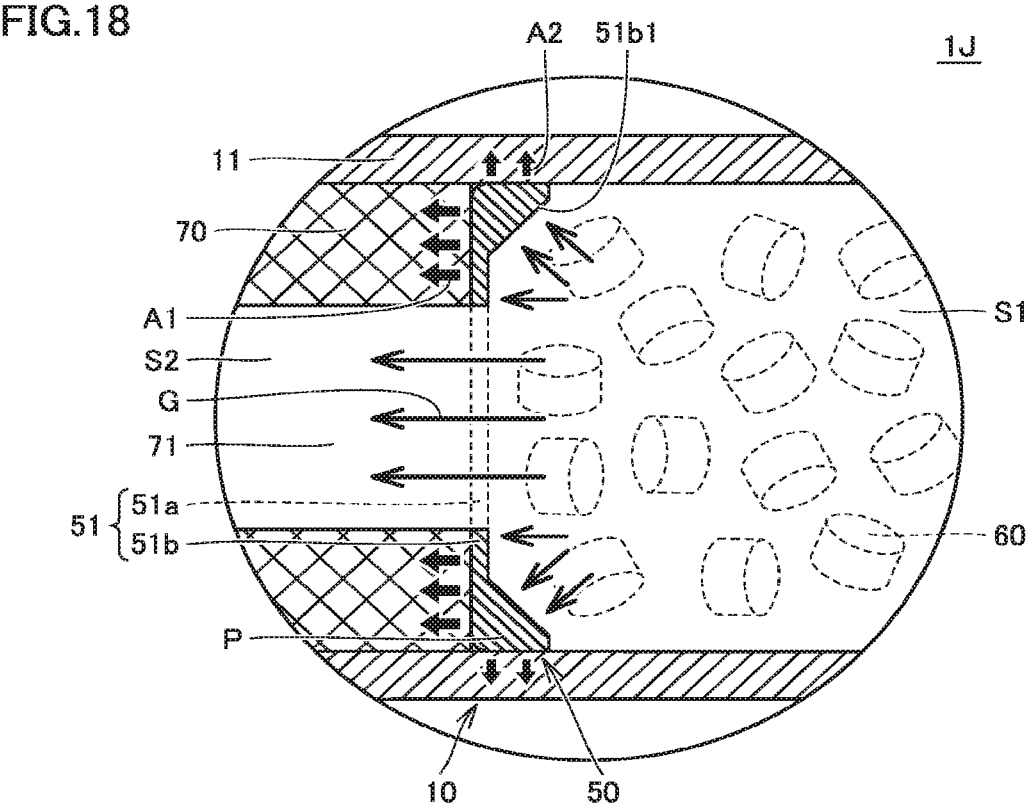
FIG. 18 is an enlarged cross-sectional view of the main portion showing a state at the time when the cylinder type gas generator shown in FIG. 17 is activated.

FIG. 17 is an enlarged cross-sectional view of a main portion of a cylinder type gas generator in Embodiment 10 of the present invention and FIG. 18 is an enlarged cross-sectional view of the main portion showing a state at the time when the cylinder type gas generator shown in FIG. 17 is activated. A cylinder type gas generator 1J in the present embodiment will be described below with reference to FIGS. 17 and 18.

As shown in FIG. 17, cylinder type gas generator 1J in the present embodiment is different from cylinder type gas generator 1G in Embodiment 7 described above only in shape of partition portion 51 of partition member 50. Specifically, in cylinder type gas generator 1J in the present embodiment, a boundary between a portion small in thickness and a portion large in thickness of partition portion 51 does not match with the inner edge of a portion of filter 70 except for hollow portion 71, and partition portion 51 is arranged at a position intermediate between the inner edge and the outer edge of the portion. In this case, though large-thickness portion P constructed to be greater in thickness than first region 51*a* is provided only at a position in second region 51*b* closer to the outer circumferential end portion, large-thickness portion P is located to be opposed to the outer edge portion of filter 70 on the side of combustion chamber S1.

With such a construction as well, as shown in FIG. 18, thrust of a gas generated in combustion chamber S1 is applied not only in the axial direction but also in the radial direction to annular inclined surface 51*b*1 of second region 51*b* which remains without bursting and melting at the time of activation. Therefore, second region 51*b* deforms as spreading radially outward and comes in intimate contact with the inner circumferential surface of housing main body 10.

Therefore, with cylinder type gas generator 1J in the present embodiment as well, an effect comparable to the effect described in Embodiment 7 described above can be obtained, reduction in size and weight can be achieved without lowering in performance, and manufacturing cost can significantly be suppressed.

When such a construction is adopted, as shown in FIG. 18, a portion of second region 51*b* described above which is comparable in thickness to first region 51*a* (that is, a portion of second region 51*b* except for large-thickness portion P) remains without bursting and melting at the time of activation. The reason why that portion does not burst and melt in spite of being comparable in thickness to first region 51*a* is that this portion is supported by filter 70 and in contact with filter 70 and accordingly heat of that position positively conducts to filter 70. Therefore, when the construction is adopted as well, the portion of the axial end surface of filter 70 located on the side of combustion chamber S1 except for hollow portion 71 is covered with second region 51*b* at the time of activation, and hence break of filter 70 can be prevented.

(Embodiment 11)

Figure 19:
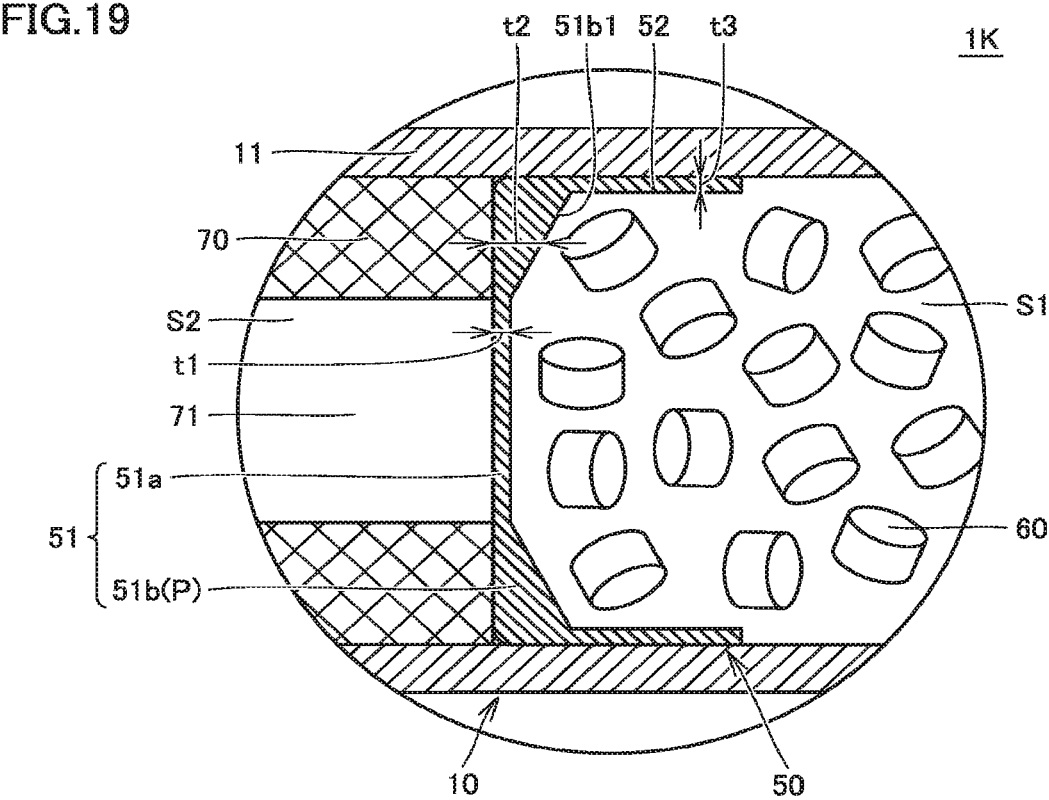
FIG. 19 is an enlarged cross-sectional view of a main portion of a cylinder type gas generator in Embodiment 11 of the present invention.
Figure 20:
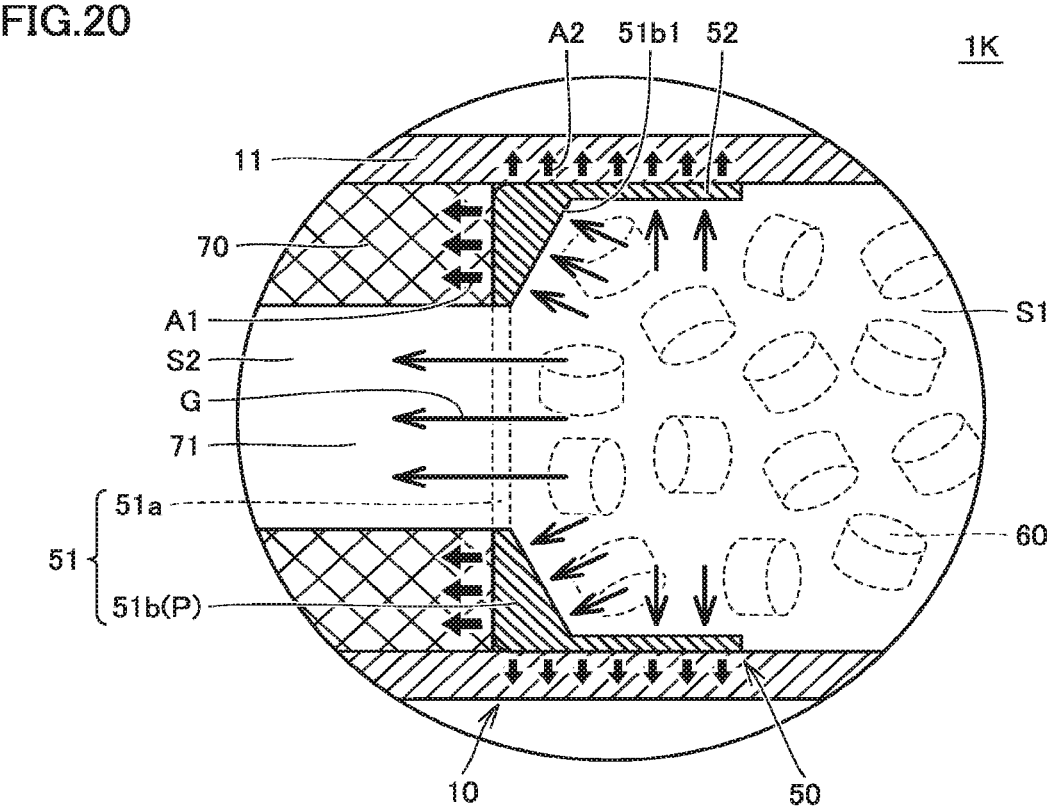
FIG. 20 is an enlarged cross-sectional view of the main portion showing a state at the time when the cylinder type gas generator shown in FIG. 19 is activated.

FIG. 19 is an enlarged cross-sectional view of a main portion of a cylinder type gas generator in Embodiment 11 of the present invention and FIG. 20 is an enlarged cross-sectional view of the main portion showing a state at the time when the cylinder type gas generator shown in FIG. 19 is activated. A cylinder type gas generator 1K in the present embodiment will be described below with reference to FIGS. 19 and 20.

As shown in FIG. 19, cylinder type gas generator 1K in the present embodiment is different from cylinder type gas generator 1G in Embodiment 7 described above only in construction of partition member 50. Specifically, in cylinder type gas generator 1K in the present embodiment, partition member 50 has, in addition to partition portion 51 described above, a cylindrical portion 52 extending from the outer circumferential end portion of partition portion 51 along the inner circumferential surface of housing main body 10 toward igniter assembly 30B.

Cylindrical portion 52 is formed to have thickness t3 relatively smaller than thickness t2 of second region 51b. Thickness t3 of cylindrical portion 52 is comparable to a thickness of cylindrical portion 43 of cup body 41 in Embodiment 1 described above.

With such a construction, as shown in FIG. 20, thrust of a gas generated in combustion chamber S1 is applied not only in the axial direction but also in the radial direction to annular inclined surface 51b1 of second region 51b which remains without bursting and melting at the time of activation, and in addition, thrust of the gas generated in combustion chamber S1 is applied in the radial direction also to the inner circumferential surface of cylindrical portion 52 which remains without bursting and melting at the time of activation. Therefore, second region 51b deforms as spreading radially outward and is in intimate contact with the inner circumferential surface of housing main body 10. Furthermore, cylindrical portion 52 which is a portion continuous to second region 51b is in intimate contact with the inner circumferential surface of housing main body 10. Therefore, a gap can more reliably be prevented from being provided between partition member 50 and housing main body 10 and leakage of the gas through that portion can further reliably be prevented.

The reason why cylindrical portion 52 does not burst and melt in spite of being comparable in thickness to first region 51a is that cylindrical portion 52 is in intimate contact with circumferential wall portion 11 of housing main body 10 with increase in pressure in combustion chamber S1 and accordingly heat of cylindrical portion 52 positively conducts to circumferential wall portion 11.

Therefore, with cylinder type gas generator 1K in the present embodiment as well, an effect the same as the effect described in Embodiment 7 described above can be obtained, reduction in size and weight can be achieved without lowering in performance, and manufacturing cost can significantly be suppressed.

(Embodiment 12)

FIG. 21 is an enlarged cross-sectional view of a main portion of a cylinder type gas generator in Embodiment 12 of the present invention and FIG. 22 is an enlarged cross-sectional view of the main portion showing a state at the time when the cylinder type gas generator shown in FIG. 21 is activated. A cylinder type gas generator 1L in the present embodiment will be described below with reference to FIGS. 21 and 22.

As shown in FIG. 21, cylinder type gas generator 1L in the present embodiment is different from cylinder type gas generator 1K in Embodiment 11 described above only in shape of second region 51b provided in partition portion 51 of partition member 50. Specifically, in cylinder type gas generator 1L in the present embodiment, second region 51b is formed in a shape of an annular flat plate uniform in thickness t2, and thus the entire second region 51b is provided as large-thickness portion P constructed to be greater in thickness than first region 51a. In this case, an inner space defined by second region 51b is not gradually tapered from the side of combustion chamber S1 toward filter chamber S2 but is formed in a columnar shape.

With such a construction, as shown in FIG. 22, thrust of a gas generated in combustion chamber S1 is applied only in the axial direction to second region 51b which remains without bursting and melting at the time of activation, and thrust of the gas generated in combustion chamber S1 is applied in the radial direction to the inner circumferential surface of cylindrical portion 52 which remains without bursting and melting at the time of activation. Therefore, cylindrical portion 52 which is a portion continuous to second region 51b is strongly pressed against the inner circumferential surface of housing main body 10. Therefore, since cylindrical portion 52 of partition member 50 is in intimate contact with the inner circumferential surface of housing main body 10, a gap can be prevented from being provided between these components, and leakage of the gas through that portion can be prevented.

A boundary portion between second region 51b and cylindrical portion 52 which are different from each other in thickness are more likely to break than other portions. Even if such a portion is broken, however, large-thickness portion P relatively large in thickness is located between that portion and the axial end surface of filter 70. Therefore, so long as large-thickness portion P abuts on circumferential wall portion 11 of housing main body 10, the gas will not leak through that portion.

Therefore, with cylinder type gas generator 1L in the present embodiment as well, an effect comparable to the effect described in Embodiment 11 described above can be obtained, reduction in size and weight can be achieved without lowering in performance, and manufacturing cost can significantly be suppressed.

(Embodiment 13)

Figure 23:
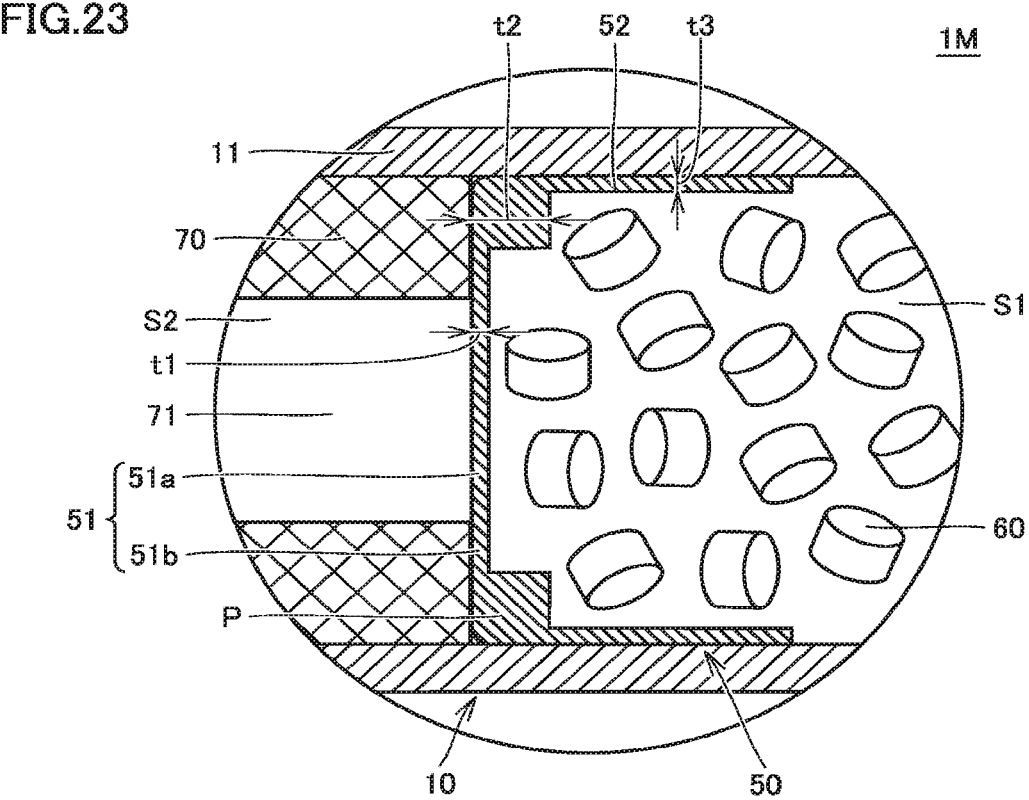
FIG. 23 is an enlarged cross-sectional view of a main portion of a cylinder type gas generator in Embodiment 13 of the present invention.
Figure 24:
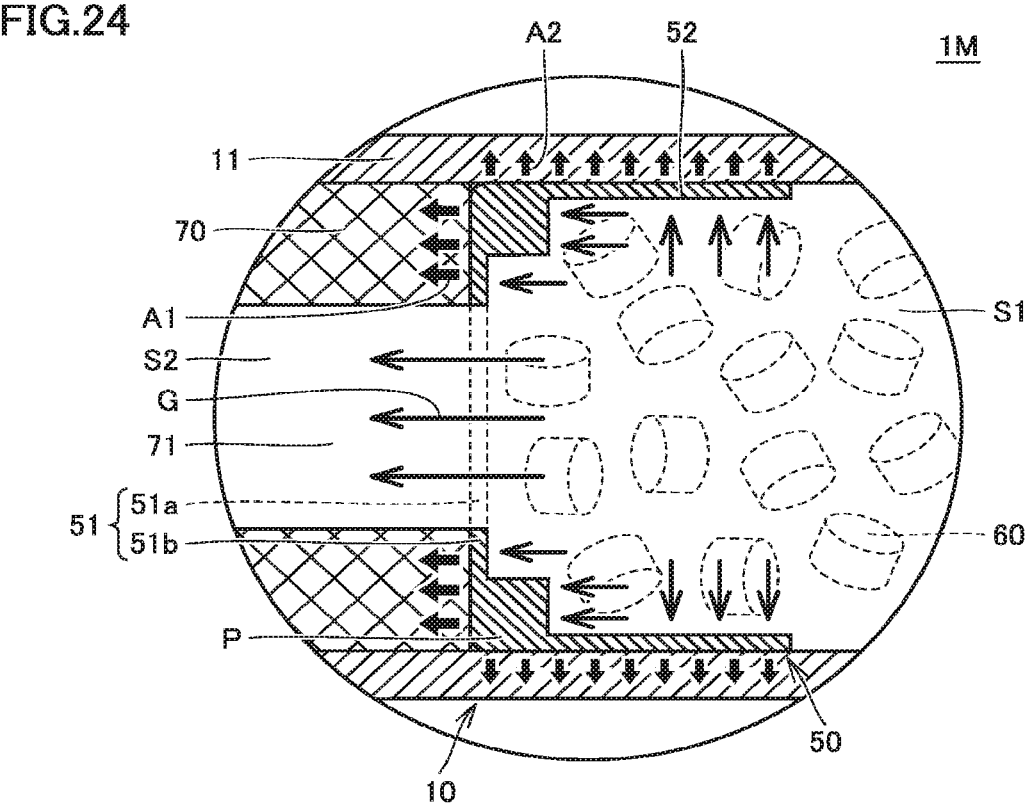
FIG. 24 is an enlarged cross-sectional view of the main portion showing a state at the time when the cylinder type gas generator shown in FIG. 23 is activated.

FIG. 23 is an enlarged cross-sectional view of a main portion of a cylinder type gas generator in Embodiment 13 of the present invention and FIG. 24 is an enlarged cross-sectional view of the main portion showing a state at the time when the cylinder type gas generator shown in FIG. 23 is activated. A cylinder type gas generator 1M in the present embodiment will be described below with reference to FIGS. 23 and 24.

As shown in FIG. 23, cylinder type gas generator 1M in the present embodiment is different from cylinder type gas generator 1L in Embodiment 12 described above only in shape of partition portion 51 of partition member 50. Specifically, in cylinder type gas generator 1M in the present embodiment, a boundary between the portion small in thickness and the portion large in thickness of partition portion 51 does not match with the inner edge of the portion of filter 70 except for hollow portion 71, and partition portion 51 is arranged at a position intermediate between the inner edge and the outer edge of the portion. In this case, though large-thickness portion P constructed to be greater in thickness than first region 51a is provided only at a position in second region 51b closer to the outer circumferential end portion, large-thickness portion P is located to be opposed to the outer edge portion of filter 70 on the side of combustion chamber S1.

With such a construction as well, as shown in FIG. 24, thrust of a gas generated in combustion chamber S1 is applied in the radial direction to the inner circumferential surface of cylindrical portion 52 which remains without bursting and melting at the time of activation. Therefore, cylindrical portion 52 which is a portion continuous to second region 51b is strongly pressed against the inner circumferential surface of housing main body 10 and in intimate contact therewith.

Therefore, with cylinder type gas generator 1M in the present embodiment as well, an effect comparable to the effect described in Embodiment 12 described above can be obtained, reduction in size and weight can be achieved without lowering in performance, and manufacturing cost can significantly be suppressed.

When such a construction is adopted, as shown in FIG. 24, a portion of second region 51b described above which is comparable in thickness to first region 51a (that is, a portion of second region 51b except for large-thickness portion P) remains without bursting and melting at the time of activation. The reason why that portion does not burst and melt in spite of being comparable in thickness to first region 51a is that this portion is supported by filter 70 and in contact with filter 70 and accordingly heat of that position positively conducts to filter 70. Therefore, when the construction is adopted as well, the portion of the axial end surface of filter 70 on the side of combustion chamber S1 except for hollow portion 71 is covered with second region 51b at the time of activation, and hence break of filter 70 can be prevented.

Though description has been given in Embodiments 1 to 13 of the present invention described above with reference to an example in which second region 42b or 51b provided in the partition member abuts on the end surface of filter 70 on the side of combustion chamber S1 while the gas generator is not activated, the second region does not necessarily have to abut thereon and it may be located at some distance with some gap being interposed. In that case as well, at the time of activation, with thrust of the gas, second region 42b or 51b abuts of itself on the end surface of filter 70 on the side of combustion chamber S1 and sufficiently functions as the pressure bulkhead.

Though description has been given in Embodiments 1 to 13 of the present invention described above with reference to an example in which only an ignition agent is loaded or an ignition agent and an enhancer agent are loaded in ignition portion 32a of igniter 32, in loading an enhancer agent, the enhancer agent does not necessarily have to be loaded in ignition portion 32a of igniter 32, but may be loaded at a position between ignition portion 32a of igniter 32 and gas generating agent 60, for example, with the use of a cup-shaped member or a container.

Though description has been given in Embodiments 1 to 13 of the present invention described above with reference to an example in which housing main body 10 and closing member 20 are coupled to each other by fixing by caulking and housing main body 10 and igniter assembly 30A or 30B are coupled to each other by fixing by caulking, welding can also naturally be made use of for fixing housing main body 10 and closing member 20 to each other and/or fixing housing main body 10 and igniter assembly 30A or 30B to each other.

Though description has been given in Embodiments 1 to 13 of the present invention described above with reference to an example in which housing main body 10 and closing member 20 are members separate from each other, they may integrally be formed from a cylindrical member with bottom formed from a single member.

In addition, though description has been given in Embodiments 1 to 13 of the present invention described above with reference to an example in which the present invention is applied to a cylinder type gas generator incorporated in a side air bag apparatus, applications of the present invention are not limited thereto and the present invention can be applied also to a cylinder type gas generator incorporated in an air bag apparatus on a passenger's seat side, a curtain air bag apparatus, a knee air bag apparatus, or a seat cushion air bag apparatus or what is called a T-shaped gas generator having an elongated outer geometry similarly to the cylinder type gas generator.

Furthermore, characteristic features shown in Embodiments 1 to 13 of the present invention described above can naturally be combined with one another within the scope allowable in terms of construction of an apparatus.

The embodiments disclosed herein are thus illustrative and non-restrictive in every respect. The technical scope of the present invention is delimited by the terms of the claims, and includes any modifications within the scope and meaning equivalent to the terms of the claims.

REFERENCE SIGNS LIST 1A to 1M cylinder type gas generator; 10 housing main body; 11 circumferential wall portion; 12 gas discharge opening; 13, 14 caulking portion; 20 closing member; 21 annular groove portion; 30A, 30B igniter assembly; 31 holder; 31a through portion; 31b annular groove portion; 31c caulking portion; 31d annular groove portion; 31e recess portion; 32 igniter; 32a ignition portion; 32b terminal pin; 33 holding portion; 33a recess portion; 34, 35 sealing member; 40 sealed container; 41 cup body; 42 bottom portion; 42a first region; 42b second region; 42b1 inclined surface; 42b2 curved surface; 43 cylindrical portion; 44 cap body; 45 accommodation space; 50 partition member; 51 partition portion; 51a first region; 51b second region; 51b1 inclined surface; 51b2 curved surface; 52 cylindrical portion; 60 gas generating agent; 61 cushion material; 62 coil spring; 62a spring portion; 62b pressing portion; 70 filter; 71 hollow portion; 80 sealing tape; P large-thickness portion; S1 combustion chamber; and S2 filter chamber.

The invention claimed is:

1. A gas generator comprising:
an elongated cylindrical housing containing a combustion chamber accommodating a gas generating agent and a filter chamber accommodating a filter and having opposing ends closed;
a partition member inserted in the housing and axially dividing a space in the housing into the combustion chamber and the filter chamber; and
an igniter assembled to the housing, for burning the gas generating agent,
the housing having in a portion defining the filter chamber, a gas discharge opening for discharging a gas to outside,
the filter being formed from a member having a hollow portion extending along an axial direction of the housing and reaching an axial end surface located on a side of the combustion chamber,
the partition member having a partition portion opposed to the axial end surface of the filter,
the partition portion including a first region which opens as a result of burning of the gas generating agent as being located to be opposed to the hollow portion and a second region which does not open in spite of burning of the gas generating agent as being annularly located to surround the first region so as to be opposed to a portion of the axial end surface of the filter except for the hollow portion,
the second region being provided with a large-thickness portion constructed to be greater in thickness than the first region and at least opposed to an outer edge portion of the axial end surface of the filter, and the large-thickness portion being constructed to gradually be greater in thickness from an inner circumferential end portion toward an outer circumferential end portion.

2. The gas generator according to claim 1, wherein the partition member further has a cylindrical portion extending from the outer circumferential end portion of the large-thickness portion along an inner circumferential surface of the housing toward the combustion chamber.

3. A gas generator comprising:

an elongated cylindrical housing containing a combustion chamber accommodating a gas generating agent and a filter chamber accommodating a filter and having opposing ends closed;

a partition member inserted in the housing and axially dividing a space in the housing into the combustion chamber and the filter chamber; and an igniter assembled to the housing, for burning the gas generating agent, the housing having in a portion defining the filter chamber, a gas discharge opening for discharging a gas to outside, the filter being formed from a member having a hollow portion extending along an axial direction of the housing and reaching an axial end surface located on a side of the combustion chamber, the partition member having a partition portion opposed to the axial end surface of the filter and a cylindrical portion extending from an outer circumferential end portion of the partition portion along an inner circumferential surface of the housing toward the combustion chamber, the partition portion including a first region which opens as a result of burning of the gas generating agent as being located to be opposed to the hollow portion and a second region which does not open in spite of burning of the gas generating agent as being annularly located to surround the first region so as to be opposed to a portion of the axial end surface of the filter except for the hollow portion, and the second region being provided with a large-thickness portion constructed to be greater in thickness than the first region and at least opposed to an outer edge portion of the axial end surface of the filter.

4. The gas generator according to claim 3, wherein the large-thickness portion is in a shape of an annular flat plate uniform in thickness.

5. The gas generator according to claim 1, wherein the entire second region is formed from the large-thickness portion.

6. The gas generator according to claim 1, the gas generator comprising a sealed container accommodating the gas generating agent, wherein the partition member is formed from a part of the sealed container.

7. The gas generator according to claim 1, wherein the partition portion is fitted or loosely fitted to the housing.

8. The gas generator according to claim 1, wherein the partition portion abuts on the axial end surface of the filter.

9. The gas generator according to claim 3, wherein the entire second region is formed from the large-thickness portion.

10. The gas generator according to claim 3, the gas generator comprising a sealed container accommodating the gas generating agent, wherein the partition member is formed from a part of the sealed container.

11. The gas generator according to claim 3, wherein the partition portion is fitted or loosely fitted to the housing.

12. The gas generator according to claim 3, wherein the partition portion abuts on the axial end surface of the filter.

* * * * *